United States Patent
Kamo et al.

(10) Patent No.: US 9,831,495 B2
(45) Date of Patent: Nov. 28, 2017

(54) NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE MATERIAL FOR A NON-AQUEOUS ELECTROLYTE SECONDARY BATTERY

(71) Applicant: SHIN-ETSU CHEMICAL CO., LTD., Tokyo (JP)

(72) Inventors: Hiromichi Kamo, Takasaki (JP); Kenta Fujisaki, Annaka (JP); Takumi Matsuno, Annaka (JP); Takakazu Hirose, Annaka (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 43 days.

(21) Appl. No.: 15/003,902

(22) Filed: Jan. 22, 2016

(65) Prior Publication Data
US 2016/0240843 A1    Aug. 18, 2016

(30) Foreign Application Priority Data
Feb. 16, 2015    (JP) .................. 2015-027597

(51) Int. Cl.
*H01M 4/36*    (2006.01)
*H01M 4/38*    (2006.01)
(Continued)

(52) U.S. Cl.
CPC ........... *H01M 4/366* (2013.01); *H01M 4/386* (2013.01); *H01M 4/483* (2013.01); *H01M 4/485* (2013.01);
(Continued)

(58) Field of Classification Search
CPC .................... H01M 4/366; H01M 10/0525
See application file for complete search history.

(56) References Cited

U.S. PATENT DOCUMENTS

| 5,395,711 | A | 3/1995 | Tahara et al. |
| 7,459,236 | B2 | 12/2008 | Konishiike et al. |

(Continued)

FOREIGN PATENT DOCUMENTS

| CA | 2 889 207 A1 | 5/2014 |
| EP | 2 088 221 A1 | 8/2009 |

(Continued)

OTHER PUBLICATIONS

Jun. 23, 2016 Extended Search Report issued in European Patent Application No. 16000160.8.

*Primary Examiner* — Stewart Fraser
*Assistant Examiner* — Olatunji Godo
(74) *Attorney, Agent, or Firm* — Oliff PLC

(57) ABSTRACT

The present invention provides a negative electrode active material for a non-aqueous electrolyte secondary battery, including negative electrode active material particles containing a silicon compound expressed by $SiO_x$ where $0.5 \leq x \leq 1.6$, the negative electrode active material particles at least partially coated with a carbon coating, the carbon coating exhibiting a peak at $2\theta=25.5°$ having a half width of $1.5°$ to $4.5°$ in an X-ray diffraction spectrum measured after separating the carbon coating from the negative electrode active material particles, the carbon coating exhibiting scattering peaks at $1330\ cm^{-1}$ and $1580\ cm^{-1}$ in Raman spectrum obtained by Raman spectrometry measured after separating the carbon coating from the negative electrode active material particles, wherein a ratio of an intensity of the scattering peak at $1330\ cm^{-1}$ to that at $1580\ cm^{-1}$ satisfies $0.7 < I_{1330}/I_{1580} < 2.0$. This negative electrode active material (Continued)

can increase the battery capacity and improve the cycle performance and battery initial efficiency.

22 Claims, 4 Drawing Sheets

(51) Int. Cl.
    *H01M 4/485* (2010.01)
    *H01M 4/62* (2006.01)
    *H01M 4/48* (2010.01)
    H01M 4/587 (2010.01)
    H01M 10/052 (2010.01)
    H01M 4/02 (2006.01)

(52) U.S. Cl.
    CPC ........... *H01M 4/625* (2013.01); *H01M 4/364* (2013.01); *H01M 4/587* (2013.01); *H01M 10/052* (2013.01); *H01M 2004/021* (2013.01); *H01M 2004/027* (2013.01)

(56) References Cited

U.S. PATENT DOCUMENTS

| | | | |
|---|---|---|---|
| 8,377,592 B2 | 2/2013 | Jeong et al. | |
| 2003/0215711 A1* | 11/2003 | Aramata | B82Y 30/00 429/218.1 |
| 2006/0099507 A1 | 5/2006 | Kogetsu et al. | |
| 2008/0176137 A1 | 7/2008 | Endo et al. | |
| 2009/0202911 A1 | 8/2009 | Fukuoka et al. | |
| 2012/0321960 A1* | 12/2012 | Kim | H01M 4/133 429/231.8 |

FOREIGN PATENT DOCUMENTS

| | | |
|---|---|---|
| EP | 2 565 965 A1 | 3/2013 |
| EP | 2 610 949 A1 | 7/2013 |
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2013-513206 A | 4/2013 |
| WO | 2011068767 A1 | 6/2011 |

* cited by examiner

NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE MATERIAL FOR A NON-AQUEOUS ELECTROLYTE SECONDARY BATTERY

BACKGROUND OF THE INVENTION

Field of the Invention

The present invention relates to a negative electrode active material for a non-aqueous electrolyte secondary battery, a non-aqueous electrolyte secondary battery containing the same, and a method of producing a negative electrode material for a non-aqueous electrolyte secondary battery.

Description of the Related Art

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon materials ranges from a standard application type to an integrated type in which the materials are directly accumulated on a current collector.

Use of silicon as a main material of a negative electrode active material, however, expands or shrinks a negative electrode active material particle when charging or discharging, thereby making the negative electrode active material particle easy to break particularly near its surface layer. In addition, this active material particle produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial battery efficiency and the cycle performance.

More specifically, a vapor deposition method is used to accumulate silicon and amorphous silicon dioxide simultaneously so that better cycle performance and greater safety are achieved (See Patent Document 1, for example). Moreover, a carbon material, an electronic conduction material, is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). Moreover, a lithium containing material is added to a negative electrode, and pre-doping that decompose lithium and moves the lithium to a positive electrode at a higher negative-electrode potential so that the first charge and discharge efficiency is improved (See Patent Document 6, for example).

Moreover, $SiO_x$ ($0.8 \leq x \leq 1.5$) having a particle size ranging from 1 μm to 50 μm and a carbon material are mixed and calcined at a high temperature so that improved cycle performance is achieved (See Patent Document 7, for example). Moreover, a mole ratio of oxygen to silicon in a negative electrode active material is adjusted in the range from 0.1 to 0.2 so as to hold a difference between the maximum and the minimum of the oxygen-to-silicon mole ratio near the interface between the active material and a current collector at 0.4 or less, so that improved cycle performance is achieved (See Patent Document 8, for example). Moreover, a metal oxide containing lithium is used to improve the battery load characteristic (See Patent Document 9, for example). Moreover, a hydrophobic layer such as a silane compound is formed in the surface layer of a silicon material so that improved cycle performance is achieved (See Patent Document 10, for example).

Moreover, a silicon oxide is used and coated with graphite to give conductivity so that improved cycle performance is achieved (See Patent Document 11, for example). Patent Document 11 describes that a shift value of the graphite coating, which is obtained from a Raman spectrum, has broad peaks at 1330 $cm^{-1}$ and 1580 $cm^{-1}$ and a ratio $I_{1330}/I_{1580}$ of its intensity shows $1.5 < I_{1330}/I_{1580} < 3$.

Moreover, a particle having an Si-microcrystal phase dispersing in a silicon dioxide is used to achieve a higher battery capacity and improved cycle performance (See Patent Document 12, for example). Finally, a silicon oxide having a silicon-to-oxygen atomicity ratio of 1:y ($0 < y < 2$) is used to improve overcharge and overdischarge performance (See Patent Document 13, for example).

CITATION LIST

Patent Literature

[Patent Document 1] Japanese Patent Application Publication No. 2001-185127

[Patent Document 2] Japanese Patent Application Publication No. 2002-042806
[Patent Document 3] Japanese Patent Application Publication No. 2006-164954
[Patent Document 4] Japanese Patent Application Publication No. 2006-114454
[Patent Document 5] Japanese Patent Application Publication No. 2009-070825
[Patent Document 6] Japanese Patent Application Publication No. 2013-513206
[Patent Document 7] Japanese Patent Application Publication No. 2008-282819
[Patent Document 8] Japanese Patent Application Publication No. 2008-251369
[Patent Document 9] Japanese Patent Application Publication No. 2008-177346
[Patent Document 10] Japanese Patent Application Publication No. 2007-234255
[Patent Document 11] Japanese Patent Application Publication No. 2009-212074
[Patent Document 12] Japanese Patent Application Publication No. 2009-205950
[Patent Document 13] Japanese Patent No. 2997741

SUMMARY OF THE INVENTION

As described previously, small electronic devices, represented by mobile terminals, have been developed to improve their performance and increase their functions. Non-aqueous electrolyte secondary batteries, especially lithium-ion secondary batteries, which are used as main sources of the devices, have been required to increase the battery capacity. The development of non-aqueous electrolyte secondary batteries including negative electrodes mainly using silicon materials have been desired to solve this problem. The non-aqueous electrolyte secondary batteries using silicon materials need the same cycle performance as non-aqueous electrolyte secondary batteries using carbon materials.

The present invention was accomplished in view of the above problems, and an object thereof is to provide a negative electrode active material for a non-aqueous electrolyte secondary battery that can increase the battery capacity and improve the cycle performance and battery initial efficiency. Another object of the present invention is to provide a non-aqueous electrolyte secondary battery using the negative electrode active material. Further object of the present invention is to provide a method of producing a negative electrode material for a non-aqueous electrolyte secondary battery that is increased in battery capacity and is excellent in cycle performance and battery initial efficiency.

To achieve the objects, the present invention provides a negative electrode active material for a non-aqueous electrolyte secondary battery, comprising negative electrode active material particles containing a silicon compound expressed by $SiO_x$ where $0.5 \leq x \leq 1.6$, the negative electrode active material particles at least partially coated with a carbon coating, the carbon coating exhibiting a peak at $2\theta=25.5°$ having a half width of $1.5°$ to $4.5°$ in an X-ray diffraction spectrum measured after separating the carbon coating from the negative electrode active material particles, the carbon coating exhibiting scattering peaks at $1330$ $cm^{-1}$ and $1580$ $cm^{-1}$ in Raman spectrum obtained by Raman spectrometry measured after separating the carbon coating from the negative electrode active material particles, wherein a ratio of an intensity of the scattering peak at $1330$ $cm^{-1}$ to that at $1580$ $cm^{-1}$ satisfies $0.7<I_{1330}/I_{1580}<2.0$.

The inventive negative electrode active material has negative electrode active material particles containing a silicon compound, which remarkably increases the battery capacity compared with the case mainly using carbon-cased active material particles, and the negative electrode active material particles are at least partially coated with a carbon coating, which leads to excellent conductivity. The half width of the peak at $2\theta=25.5°$ satisfying the above range in an X-ray diffraction spectrum of the carbon coating separated from the negative electrode active material particles allows the negative electrode active material to have more excellent conductivity and good impregnation property of an electrolyte. Moreover, the intensity ratio $I_{1330}/I_{1580}$ within the above range in Raman spectrum of the carbon coating separated from the negative electrode active material particles allows the optimum ratio of a carbon material with the diamond structure to a carbon material with the graphite structure in the carbon coating. In addition, since the measurement of the X-ray diffraction spectrum and the Raman spectrum are performed with respect to the separated carbon coating, the effect of the silicon compound or the like can be eliminated, thereby enabling pure characteristics of the carbon coating to be measured. When such a negative electrode active material is used for a negative electrode of a non-aqueous electrolyte secondary battery, the non-aqueous electrolyte secondary battery can achieve high capacity, good cycle performance, and good first charge and discharge efficiency. Hereinafter, the inventive negative electrode active material particle consisting of a silicon compound and coated with a carbon coating is also referred to as "silicon-based active material particle".

The amount of the carbon coating is preferably within a range of 0.1 mass % to 25 mass % with respect to the negative electrode active material particles.

The carbon coating within the above range enables the silicon compound, which has high capacity, to be contained with a proper amount so that sufficient battery capacity can be ensured.

The carbon coating preferably has a true density ranging from $1.2$ $g/cm^3$ to $1.9$ $g/cm^3$.

When the true density is $1.9$ $g/cm^3$ or less, the carbon coating on the silicon compound is not excessively dense. Accordingly, an electrolyte can be easily penetrated into the internal silicon compound, resulting in further improved battery performances such as the cycle performance and the first charge and discharge efficiency. Meanwhile when the true density is $1.2$ $g/cm^3$ or more, the silicon-based active material particle has a proper specific surface area. Accordingly, when a negative electrode is produced, a binder can be adsorbed thereto with a proper amount to improve the effect of the binder, thereby further improving the battery performances.

The carbon coating preferably exhibits a bulk density ranging from $1.0 \times 10^{-2}$ $g/cm^3$ to $1.2 \times 10^{-1}$ $g/cm^3$ when the carbon coating is separated from the negative electrode active material particles.

The negative electrode active material, which contains the silicon-based active material particles the carbon coating of which exhibits a bulk density within the above range when separated from the silicon-based active material particles, has excellent binding property as well as impregnation property of an electrolyte when used for a battery.

H/I preferably ranges from $1.0 \times 10^{-1}$ $g/cm^3$ to $1.0$ $g/cm^3$, where H ($g/cm^3$) is a bulk density of the carbon coating separated from the negative electrode active material particles and I (mass %) is a mass percentage of carbon contained in the negative electrode active material particles to that of the negative electrode active material particles.

When the ratio H/I satisfies the above range, the density of the carbon coating can be made proper so that a binder is appropriately adsorbed to the surface of the silicon-based active material particles.

The separation of the carbon coating may be performed by reacting the negative electrode active material particles with a solution containing hydrofluoric acid and nitric acid and removing the silicon compound from the negative electrode active material particles.

The separation of the carbon coating can be specifically performed in such a manner.

The carbon coating preferably exhibits fragments of $C_yH_z$ compound when subjected to Time-of-Flight Secondary Ion Mass Spectrometry (TOF-SIMS), and a part of the fragments of $C_yH_z$ compound preferably satisfies $6 \geq y \geq 2$ and $2y+2 \geq z \geq 2y-2$.

The surface on which fragments of compound such as $C_yH_z$ compound are detected through TOF-SIMS is compatible with a negative-electrode binder such as carboxymethyl cellulose solution (CMC) or polyimide, resulting in better battery performances.

A ratio of a $C_4H_9$ detected intensity D to a $C_3H_5$ detected intensity E of the fragments of $C_yH_z$ compound exhibited by the carbon coating during the TOF-SIMS preferably satisfies $2.5 \geq D/E \geq 0.3$.

When the intensity ratio of $C_4H_9$ to $C_3H_5$ is within the above range, the effect of improving conductivity due to the carbon coating can be more effectively obtained.

The negative electrode active material particles preferably have a specific surface area ranging from 1.0 $m^2$/g to 15 $m^2$/g.

The silicon-based active material particles having a specific surface within the above range exhibits more excellent binding property and impregnation property of an electrolyte when used for a battery.

An average thickness of the carbon coating is preferably within a range from 5 nm to 500 nm.

When the average thickness of the carbon coating satisfies the above range, sufficient conductivity can be provided as well as the proportion of the silicon compound can be increased.

An average coverage of the carbon coating is preferably 30% or more.

This average coverage enables the carbon components to effectively improve the conductivity of a lithium-ion secondary battery using the negative electrode active material containing these silicon-based active material particles.

The carbon coating is preferably formed by pyrolyzing a compound containing carbon.

The carbon coating obtained by such a method has high average coverage on the surface of the silicon-based active material particles.

The silicon compound preferably satisfies formula (1) of $5.0 \geq A/B \geq 0.01$ and $6.0 \geq (A+B)/C \geq 0.02$ where A is a peak area of an amorphous silicon region represented by a chemical shift value of −20 ppm to −74 ppm, B is a peak area of a crystalline silicon region represented by a chemical shift value of −75 ppm to −94 ppm, and C is a peak area of a silica region represented by a chemical shift value of −95 ppm to −150 ppm, the chemical shift value being obtained from a $^{29}$Si-Magic Angle Spinning (MAS)-Nuclear Magnetic Resonance (NMR) spectrum.

When the silicon compound contained in the silicon-based active material particles has a peak area satisfying formula (1) in $^{29}$Si-MAS-NMR spectrum, the proportion of an amorphous silicon, which can inhibit the expansion of a negative electrode due to the insertion of lithium, is high, and thus better cycle performance can be obtained. In addition, this enables inhibition of the reduction in electronic conductivity in the silicon compound since the proportion of the silica component is smaller than that of the silicon components.

The negative electrode active material particles preferably exhibits a diffraction peak having a half width ($2\theta$) of $1.2°$ or more, the diffraction peak being attributable to an Si(111) crystal face and obtained by X-ray diffraction, and a crystallite size attributable to the crystal face is 7.5 nm or less.

This silicon compound, which exhibits the above half width and crystallite size, has low crystallinity and contains few Si crystal, so that the battery performances can be improved. In addition, the presence of the silicon compound having low crystallinity enables stable generation of a Li compound.

The negative electrode active material particles preferably have a median diameter ranging from 0.5 μm to 20 μm.

The negative electrode active material containing the silicon-based active material particles with the above median diameter facilitates occlusion and emission of lithium ions and inhibits the breakage of the silicon-based active material particles at charging and discharging. As a result, the capacity maintenance rate can be improved.

A part of the negative electrode active material particles preferably contains lithium.

When the silicon-based active material particles contain a Li compound, the initial efficiency is improved. In addition, since the initial efficiency of a negative electrode is increased in a non-aqueous electrolyte secondary battery using this silicon-based active material particles, unbalance between the positive electrode and the negative electrode during a cycle test is inhibited, thereby improving the maintenance rate.

The inventive negative electrode active material for a non-aqueous electrolyte secondary battery preferably further comprising carbon-based active material particles.

In the present invention, the negative electrode active material that further contains the carbon-based active material particles besides the silicon-based active material particles can achieve better cycle performance and better initial charge and discharge performance with the increase in capacity of a negative electrode.

An amount of the negative electrode active material particles is preferably 5 mass % or more with respect to the total mass of the negative electrode active material particles and the carbon-based active material particles.

The above content of the negative electrode active material particles containing the silicon compound can further increase the battery capacity.

A ratio of an average diameter G of the carbon-based active material particles to an average diameter F of the negative electrode active material particles preferably satisfies $25 \geq G/F \geq 0.5$.

When the above relationship exists between the average diameter G of the carbon-based active material particles and the average diameter F of the negative electrode active material particles containing the silicon compound, the breakage of a mixture layer can be prevented. Moreover, as the carbon-based active material is larger than the negative electrode active material particles containing the silicon compound, the volume density of the negative electrode when charging, the initial efficiency, and thus the battery energy density are improved.

The carbon-based active material particles are preferably a graphite material.

The graphite material is preferable because it can exhibit better initial efficiency and capacity maintenance rate than other carbon-based active materials.

Furthermore, to achieve the above objects, the present invention provides a non-aqueous electrolyte secondary battery comprising the above negative electrode active material.

The non-aqueous electrolyte secondary battery using the inventive negative electrode active material has good cycle performance and initial charge and discharge performance with high capacity.

Furthermore, to achieve the above objects, the present invention provides a method of producing a negative electrode material for a non-aqueous electrolyte secondary battery, the negative electrode material containing negative electrode active material particles, the method comprising: producing particles of a silicon compound expressed by $SiO_x$ where $0.5 \leq x \leq 1.6$; at least partially coating a surface of the particles of the silicon compound with a carbon coating; selecting, from the particles, silicon compound particles coated with a carbon coating exhibiting a peak at $2\theta=25.5°$ having a half width of $1.5°$ to $4.5°$ in an X-ray diffraction spectrum measured after separating the carbon coating from the silicon compound particles, and exhibiting scattering peaks at 1330 $cm^{-1}$ and 1580 $cm^{-1}$ in Raman spectrum obtained by Raman spectrometry measured after separating the carbon coating from the silicon compound particles, wherein a ratio of an intensity of the scattering peak at 1330 $cm^{-1}$ to that at 1580 $cm^{-1}$ satisfies $0.7<I_{1330}/I_{1580}<2.0$; and using the selected silicon compound particles coated with the carbon coating for the negative electrode active material particles to produce the negative electrode material.

Such a method can produce a negative electrode material, for use in a non-aqueous electrolyte secondary battery, which exhibits excellent capacity maintenance rate and initial efficiency with high capacity, by using the selected silicon compound coated with the carbon coating as the negative electrode active material particles.

The inventive negative electrode active material exhibits high capacity, good cycle performance, and good initial charge when used as a negative electrode active material of a non-aqueous electrolyte secondary battery. Moreover, the secondary battery containing the inventive negative electrode active material can achieve the same performances. In addition, electronic devices, machine tools, electric vehicles, and power storage systems, etc., using the inventive secondary battery also can achieve the same effect.

Furthermore, the inventive method of producing a negative electrode material can produce a negative electrode material, for use in a non-aqueous electrolyte secondary battery, having excellent capacity maintenance rate and initial efficiency with high capacity.

DETAILED DESCRIPTION OF THE PREFERRED EMBODIMENTS

Figure 1:
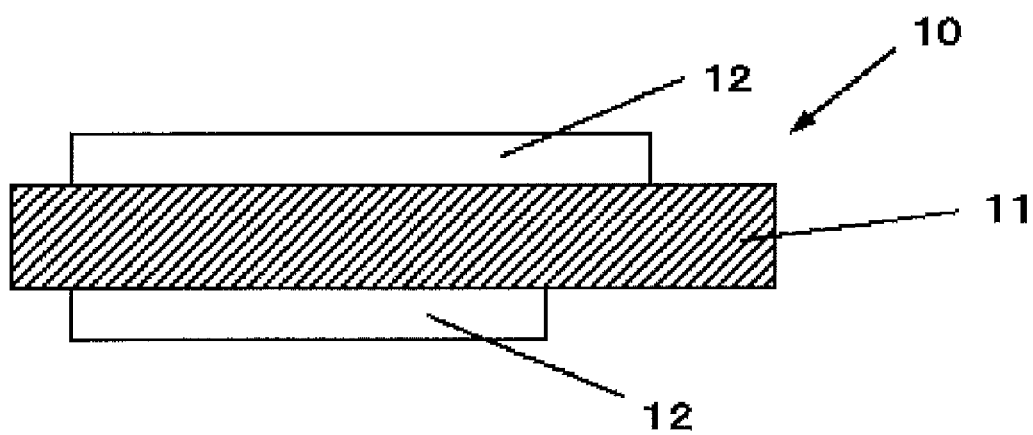
FIG. 1 is a schematic cross-sectional view of a negative electrode using the inventive negative electrode active material for a non-aqueous electrolyte secondary battery.
Figure 2:
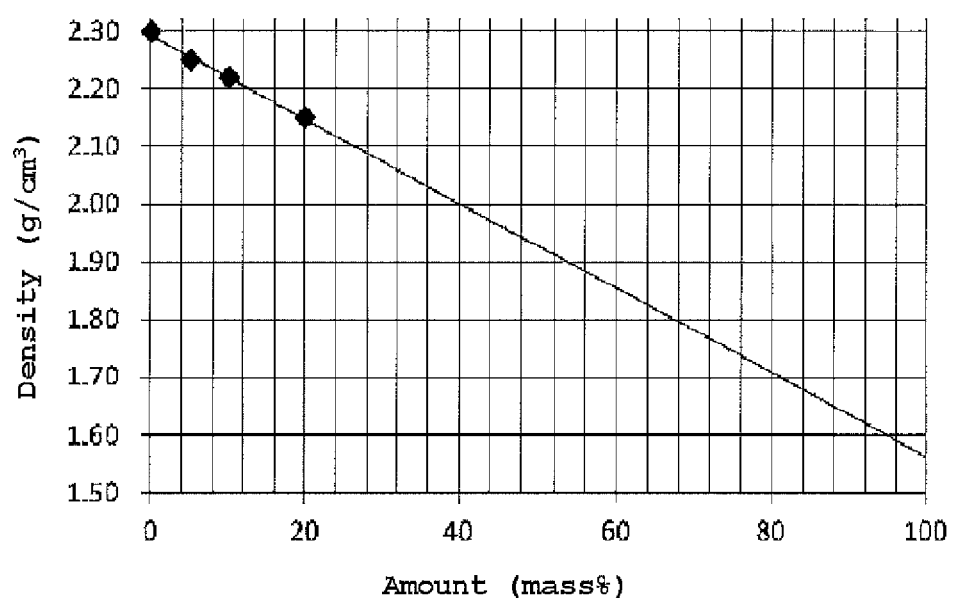
FIG. 2 is a plot for estimating the density of the carbon coating of the negative electrode active material particles in the present invention.

Hereinafter, embodiments of the present invention will be described, but the present invention is not restricted to these embodiments.

As described previously, use of a negative electrode mainly made of a silicon material, for use in a non-aqueous electrolyte secondary battery, has been considered to increase the capacity of the non-aqueous electrolyte secondary battery.

The non-aqueous electrolyte secondary battery using a silicon material is required to have the same cycle performance as a non-aqueous electrolyte secondary battery using a carbon material; however, no one has yet proposed a negative electrode material for this type of battery having the same cycle stability as a non-aqueous electrolyte secondary battery using a carbon material. In addition, a silicon compound especially containing oxygen has a lower initial efficiency than that of any carbon material, thereby limiting improvement in battery capacity.

In view of this, the present inventors diligently conducted study on a negative electrode active material that allows a non-aqueous secondary battery using a negative electrode made of this material to have good cycle performance and initial efficiency, bringing the present invention to completion.

The inventive negative electrode active material for a non-aqueous electrolyte secondary battery includes negative electrode active material particles. This negative electrode active material particles contain a silicon compound expressed by $SiO_x$ where $0.5 \leq x \leq 1.6$ and are at least partially coated with a carbon coating, hence referred to as silicon-based active material particles. The carbon coating exhibits a peak at $2\theta=25.5°$ having a half width of $1.5°$ to $4.5°$ in an X-ray diffraction spectrum measured after separating the carbon coating from the negative electrode active material particles, and further exhibits scattering peaks at 1330 $cm^{-1}$ and 1580 $cm^{-1}$ in Raman spectrum measured after separating the carbon coating from the negative electrode active material particles, in which the ratio of an intensity of the scattering peak at 1330 $cm^{-1}$ to that at 1580 $cm^{-1}$ satisfies $0.7<I_{1330}/I_{1580}<2.0$.

The inventive negative electrode active material has a large battery capacity since the negative electrode active material particles containing a silicon compound are included therein. Moreover, the inventive material has excellent conductivity since the negative electrode active material particles are at least partially coated with a carbon coating.

In an X-ray diffraction spectrum measured after separating the carbon coating, when the half width of the peak at $2\theta=25.5°$ is less than $1.5°$, the impregnation property of an electrolyte is degraded, resulting in the deterioration of the battery performances such as the cycle performance and the first charge and discharge efficiency. When the half width of the peak at $2\theta=25.5°$ is more than $4.5°$, the conductivity of the silicon-based active material particles is deteriorated. Moreover, in Raman spectrum measured after separating the carbon coating, when the intensity ratio of the scattering peak $I_{1330}/I_{1580}$ is 2.0 or more, the resistivity of the carbon coating is increased because many carbon components having disordered bond attributable to $I_{1330}$ are included therein; and thus, the surface conductivity of the silicon-based active material particles becomes poor, resulting in the deterioration of the battery performances. When the intensity ratio $I_{1330}/I_{1580}$ is 0.7 or less, current is easily concentrated on the surface of the silicon compound, which causes a fine precipitations of lithium at charging and discharging, thereby deteriorating the battery performances. Furthermore, when the intensity ratio $I_{1330}/I_{1580}$ is 0.7 or less, many carbon components such as graphite attributable to $I_{1580}$ are included, so that the ionic conductivity and the expandability of the carbon coating corresponding to the expansion of the silicon compound due to the insertion of lithium are deteriorated, resulting in reduction in the maintenance rate.

In contrast, the inventive negative electrode active material exhibits a peak at 2θ=25.5° having a half width of 1.5° to 4.5° in an X-ray diffraction spectrum measured after separating the carbon coating from the silicon-based active material particles, and has the intensity ratio $I_{1330}/I_{1580}$ satisfying $0.7<I_{1330}/I_{1580}<2.0$ in Raman spectrum measured after separating the carbon coating from the silicon-based active material particles. Accordingly, use of the inventive material for a secondary battery prevents the aforementioned deterioration of the battery performances and provides high battery capacity, good cycle performance and good first charge and discharge efficiency.

<1. Negative Electrode for Non-Aqueous Electrolyte Secondary Battery>

A negative electrode using the inventive negative electrode active material for a non-aqueous electrolyte secondary battery will be described. FIG. 1 shows the cross-section of a negative electrode using the negative electrode active material for a non-aqueous electrolyte secondary battery.

[Configuration of Negative Electrode]

As shown in FIG. 1, the negative electrode 10 has a negative electrode active material layer 12 on a negative-electrode current collector 11. The negative electrode active material layer 12 may be disposed on one side or both sides of the negative-electrode current collector 11. The negative-electrode current collector 11 is not necessarily needed in a negative electrode using the inventive negative electrode active material.

[Negative-Electrode Current Collector]

The negative-electrode current collector 11 is made of a highly conductive and mechanically strong material. Examples of the conductive material used for the negative-electrode current collector 11 include copper (Cu) and nickel (Ni). Such conductive materials preferably have inability to form an intermetallic compound with lithium (Li).

The negative-electrode current collector 11 preferably contains carbon (C) and sulfur (S) beside the main element since these elements improve the physical strength of the current collector. In particular, when the active material layer contains a material expandable at charging, the current collector including the above elements can inhibit deformation of the electrodes and the current collector itself. The content of the above elements is preferably, but not particularly limited to, 100 ppm or less. This content enables the deformation to be effectively inhibited.

The surface of the negative-electrode current collector 11 may or may not be roughed. Examples of the negative-electrode current collector the surface of which is roughened include a metallic foil subjected to an electrolyzing process, an embossing process, or a chemical etching process. Examples of the negative-electrode current collector the surface of which is not roughened include a rolled metallic foil.

[Negative Electrode Active Material Layer]

The negative electrode active material layer 12 contains the inventive negative electrode active material and may further contain other materials such as a negative-electrode binder or a negative-electrode conductive additive depending on battery design. The negative electrode active material may include a carbon-based active material particles, in addition to the negative electrode active material particles containing a silicon compound expressed by $SiO_x$ where $0.5 \leq x \leq 1.6$ (silicon-based active material particles). The inventive negative electrode active material for a non-aqueous electrolyte secondary battery can be used as a material constituting the negative electrode active material layer 12.

The silicon-based active material particles included in the inventive negative electrode active material has the silicon compound, which is capable of occluding and emitting lithium ions.

As described above, the negative electrode active material particles included in the inventive negative electrode active material is a silicon oxide containing a silicon compound ($SiO_x$, where $0.5 \leq x \leq 1.6$). A preferable composition of the silicon compound is that x is close to 1. The reason is that this composition enables high cycle performance. The present invention does not necessarily intend a silicon material composition of 100% but permits a silicon material containing a minute amount of impurities.

Further, as described above, the silicon-based active material particles included in the inventive negative electrode active material are at least partially coated with a carbon coating. Moreover, as described above, the carbon coating exhibits a peak at 2θ=25.5° having a half width of 1.5° to 4.5° in an X-ray diffraction spectrum measured after separating the carbon coating from the silicon-based active material particles, and further exhibits scattering peaks at 1330 $cm^{-1}$ and 1580 $cm^{-1}$ in Raman spectrum measured after separating the carbon coating from the silicon-based active material particles, in which the ratio of an intensity of the scattering peak at 1330 $cm^{-1}$ to that at 1580 $cm^{-1}$ satisfies $0.7<I_{1330}/I_{1580}<2.0$.

The carbon coating preferably exhibits a bulk density ranging from $1.0 \times 10^{-2}$ $g/cm^3$ to $1.2 \times 10^{-1}$ $g/cm^3$ when the carbon coating is separated from the silicon-based active material particles. When the bulk density of the carbon coating separated from the silicon-based active material particles satisfies the above range, excellent binding property and excellent impregnation property of an electrolyte can be achieved when used for a battery. In addition, when the separated carbon coating exhibits a bulk density within the range of $1.0 \times 10^{-2}$ $g/cm^3$ to $1.2 \times 10^{-1}$ $g/cm^3$, the electronic conductivity can be made proper at charging and discharging. Thus, the precipitation of lithium hardly occur, and the conductivity of a negative electrode is easy to be uniform, thereby improving the maintenance rate and the initial efficiency.

H/I preferably ranges from $1.0 \times 10^{-1}$ $g/cm^3$ to 1.0 $g/cm^3$, where H ($g/cm^3$) is a bulk density of the carbon coating separated from the silicon-based active material particles and I (mass %) is a mass percentage of carbon contained in the silicon-based active material particles to that of the silicon-based active material particles. When H/I satisfies the above range, the density of the carbon coating can be made proper so that a binder is appropriately adsorbed to the surface of the silicon-based active material particles.

The carbon coating can be separated from the silicon-based active material particles, for example, in the manner as follows: First, into a beaker made of Teflon (registered trademark) is put the silicon compound having the carbon coating, followed by adding ion-exchanged water and ethanol, and stirring with a stirrer rod made of Teflon (registered trademark). Thereafter, hydrofluoric acid is added and stirred, and nitric acid is then added. While properly adding ion-exchanged water, nitric acid is further added, and the solution is allowed to stand for 3 hours. The resulting black solution is filtered to collect the separated carbon coating. Then, the separated carbon coating is washed with water, further washed with ethanol, and dried under a vacuum at 200° C. for 10 hours. The separated carbon coating thus obtained can be subjected to various analyses including X-ray diffractometry and Raman spectroscopy. By performing the various analyses with respect to the separated carbon coating, the effect of the core material, i.e. the silicon compound, and so forth can be eliminated, thereby enabling pure characteristics of the carbon coating to be measured.

The bulk density H of the separated carbon coating can be measured, for example, in the manner as follows: First, the tare of a 100-mL measuring cylinder made of glass (in accordance with JIS R 3505) is previously measured, and to the measuring cylinder is put about 10 mL of a separated carbon coating (sealed one dried at 200° C. for 10 hours as the above example or one stored under an atmosphere with a humidity of 2% or less). Then, the measuring cylinder is tapped about 10 times to level the powder. At this time, it should be checked that the carbon powder (5% or more of the total volume) is not remarkably attached to the measuring cylinder above the plane filled with the powder. The volume and the mass of the leveled carbon powder are measured to calculate the balk density, (mass of carbon powder)/(volume of carbon powder).

An X-ray diffraction spectrum can be measured by, for example, the usual X-ray diffractometry using copper as a counter negative electrode and Cu-Kα radiation source.

A Raman spectrum can be obtained by micro-Raman analysis (i.e., Raman spectrometry), and from the obtained Raman spectrum, the ratio of a carbon component with the diamond structure to a carbon component with the graphite structure can be calculated. More specifically, diamond exhibits a sharp peak at a Raman shift of 1330 $cm^{-1}$; graphite exhibits a sharp peak at a Raman shift of 1580 $cm^{-1}$. The ratio of the carbon component with the diamond structure to one with the graphite structure can be readily obtained from the intensity ratio of these peaks. Diamond has high strength, high density, and are highly insulating; graphite is excellent in electrical conductivity. The carbon coating exhibiting the above intensity ratio makes the best use of both properties of these materials, thereby enabling the negative electrode to prevent from breaking due to the expansion and contraction of its material at charging and discharging. This negative electrode active material has conductive network.

In the present invention, the median diameter of the silicon-based active material particles is preferably within the range of 0.5 μm to 20 μm, but not particularly limited thereto. This range makes it easy to occlude and emit lithium ions and inhibits the breakage of the particles at charging and discharging. When the median diameter of the silicon-based active material particles is 0.5 μm or more, the surface area of the particles is prevented from increasing, and thus the battery irreversible capacity can be reduced. When the median diameter of the silicon-based active material particles is 20 μm or less, the breakage of the particles and the creation of a new surface are inhibited.

In the present invention, the silicon compound preferably exhibits a diffraction peak having a half width (2θ) of 1.2° or more that is attributable to an Si(111) crystal face and obtained when X-ray diffraction is performed on the silicon active material contained in the negative electrode active material particles, and a crystallite size of 7.5 nm or less that is attributable to the crystal face. The silicon compound exhibiting such half width and crystallite size has low crystallinity. When the negative electrode active material particles contain such a silicon compound having low crystallinity and few Si-crystallites, the battery performances can be improved. In addition, the presence of the silicon compound having low crystallinity enables stable generation of a Li compound.

Further, the silicon compound contained in the negative electrode active material particles preferably satisfies formula (1) of $5.0 \geq A/B \geq 0.01$ and $6.0 \geq (A+B)/C \geq 0.02$ where A is a peak area of an amorphous silicon region represented by a chemical shift value of −20 ppm to −74 ppm, B is a peak area of a crystalline silicon region represented by a chemical shift value of −75 ppm to −94 ppm, and C is a peak area of a silica region represented by a chemical shift value of −95 ppm to −150 ppm, the chemical shift value being obtained from a $^{29}$Si-MAS-NMR spectrum. The chemical shift is based on tetramethylsilane.

As the content of the amorphous silicon, which can inhibit the expansion of due to the insertion of lithium, becomes higher, the expansion of the negative electrode is inhibited more effectively when used for a battery, so the cycle performance is improved. Moreover, the silicon compound satisfying the formula (1) can inhibit the reduction in electronic conductivity in the silicon compound since the proportion of the silica component is smaller than that of the silicon components such as an amorphous silicon and a crystalline silicon, so that the battery performances can be improved.

$^{29}$Si-MAS-NMR spectrum can be measured by, for example, the following conditions.

$^{29}$Si-MAS-NMR

Apparatus: a 700-NMR spectroscope made by Bruker Corp.
Probe: a 4-mm-HR-MAS rotor, 50 μL
Sample Rotation Speed: 10 kHz
Temperature of Measurement Environment: 25° C.

The amount of the carbon coating is preferably within a range of 0.1 mass % to 25 mass % with respect to the negative electrode active material particles (i.e., the silicon-based active material particles coated with carbon coating). The amount of the carbon coating is more preferably within a range of 4 mass % to 20 mass %.

When the amount is 0.1 mass % or more, the electronic conductivity can be improved more reliably. When the amount is 25 mass % or less, the battery performances are improved, and the battery capacity becomes large. The coating method with a carbon coating containing a carbon compound is preferably, but not particularly limited to, sugar carbonization or pyrolysis of hydrocarbon gas. In these cases, the carbon coating is formed by pyrolyzing a compound containing carbon. These methods can improve the carbon coverage of the carbon coating on the surface of the silicon-based active material particles.

In the present invention, the average thickness of the carbon coating on the silicon-based active material particles is preferably within a range from 5 nm to 500 nm. When the average thickness is 5 nm or more, sufficient conductivity can be obtained, and the battery performance is improved according to the improvement in the conductivity. When the average thickness is 500 nm or less, the thickness of the carbon coating does not become excessively large with respect to the particle size of the silicon-based active material particles. Thus, the proportion of the silicon compound in the negative electrode active material can be kept high, and the energy density is improved when used for a non-aqueous electrolyte secondary battery. The average thickness of the carbon coating on the silicon-based active material particles can be measured by, for example, a cross-sectional observation with Focused Ion Beam-Transmission Electron Microscope (FIB-TEM).

In the present invention, the average coverage of the carbon coating on the silicon-based active material particles is preferably 30% or more. When the average coverage is 30% or more, the carbon components can effectively improve conductivity in particular, thereby improving battery performances. The average coverage can be defined as (carbon detected intensity)/(silicon detected intensity) on the surface by a local composition analysis with Scanning Electron Microscope-Energy Dispersive X-ray Spectroscope (SEM-EDX).

In the present invention, the carbon coating preferably exhibits fragments of $C_yH_z$ compound when subjected to TOF-SIMS, and a part of the fragments of $C_yH_z$ compound satisfies $6 \geq y \geq 2$ and $2y+2 \geq z \geq 2y-2$. The surface on which fragments of compound such as $C_yH_z$ compound are detected is compatible with a negative-electrode binder such as CMC or polyimide, resulting in better battery performances.

In this case, particularly, the ratio of a $C_4H_9$ detected intensity D to a $C_3H_5$ detected intensity E of the fragments of $C_yH_z$ compound exhibited by the carbon coating during the TOF-SIMS preferably satisfies $2.5 \geq D/E \geq 0.3$. When the intensity ratio D/E is 2.5 or less, electrical resistance of the surface is small, so that the conductivity and thus the battery performances are improved. When the intensity ratio D/E is 0.3 or more, the conductivity is improved over the entire surface due to the carbon coating because a sufficient area of the surface is coated with the carbon coating, thereby improving the battery performances. The kind and amount of the detected fragments of $C_yH_z$ compound can be adjusted by changing CVD conditions (e.g., gas and temperature) and subsequent process conditions. The subsequent process includes a firing process at about 950 to 1200° C. under a vacuum or argon atmosphere after CVD.

TOF-SIMS may be carried out, for example, under the following conditions.
PHI TRIFT 2 made by ULVAC-PHI Inc.
Primary Ion Source: Ga
Sample Temperature: 25° C.
Accelerating Voltage: 5 kV
Spot Size: 100 μm×100 μm
Sputter: Ga; 100 μm×100 μm; 10 seconds
Negative Ion Mass Spectrum
Sample: pressed powder pellet In the present invention, the carbon coating formed on the silicon-based active material particles preferably has a true density ranging from 1.2 g/cm³ to 1.9 g/cm³. When the true density of the carbon coating is 1.9 g/cm³ or less, the carbon coating on the silicon compound is not excessively dense. Accordingly, an electrolyte can be easily penetrated into the internal silicon compound, resulting in further improved battery performances such as the cycle performance and the first charge and discharge efficiency. Meanwhile when the true density is 1.2 g/cm³ or more, the silicon-based active material particle has a proper specific surface area. Accordingly, a binder can be adsorbed thereto with a proper amount to improve the effect of the binder, thereby further improving the battery performances.

The density of the carbon coating formed on the silicon-based active material particles can be estimated, as shown in Table 2, by plotting the amount of the carbon coating (mass %) with respect to the total amount of the silicon compound and the carbon coating against the density of the particles consisting of the silicon compound and the carbon coating, and extrapolating a point where the amount of the carbon coating is 100 mass %, through linear approximation. In this manner, the density of the carbon coating alone can be calculated. That is, the density of the carbon coating measured in this manner is not a density measured after separating the carbon coating.

In the present invention, the silicon-based active material particles preferably have a specific surface area ranging from 1.0 m²/g to 15 m²/g. The silicon-based active material particles having a specific surface within the above range exhibits excellent binding property and impregnation property of an electrolyte when used for a battery. The specific surface can be measured by BET method.

In the present invention, a part of the silicon-based active material particles preferably contains lithium. Lithium may be contained in the silicon-based active material particles by doping the silicon compound with lithium. Examples of the method for doping the silicon compound with lithium include a thermal doping method in which the silicon compound and metallic lithium are mixed and then heated, and an electrochemical method. When the silicon-based active material particles contain a Li compound, the initial efficiency is improved. In addition, since the initial efficiency of a negative electrode is increased in a non-aqueous electrolyte secondary battery using this particles, unbalance between the positive electrode and the negative electrode during a cycle test is inhibited, thereby improving the maintenance rate.

Example of the negative-electrode conductive additive include a carbon material selected from the group consisting of carbon black, acetylene black, graphite such as flaky graphite, ketjen black, carbon nanotube, carbon nanofiber, or the combination thereof. These conductive additives are preferably particles having a median diameter smaller than that of the silicon-based active material particles.

Moreover, the inventive negative electrode active material may further include carbon-based active material particles besides the silicon-based active material particles. In this manner, the negative electrode active material layer 12 included in the inventive negative electrode active material (see FIG. 1) can reduce its electrical resistance and a stress due to its expansion at charging. Examples of the carbon-based active material include pyrolytic carbons, cokes, glassy carbon fiber, a fired organic polymeric compound, and carbon black. Above all, the carbon-based active material particles are preferably a graphite material. The graphite material can exhibit better initial efficiency and capacity maintenance rate than other carbon-based active materials.

In the present invention, the amount of the negative electrode active material particles containing the silicon compound (silicon-based active material particles) is preferably 5 mass % or more with respect to the total mass of the silicon-based active material particles and the carbon-based active material particles. The amount of the silicon-based active material particles is more preferably less than 90 mass %. The negative electrode active material including the silicon-based active material particles with the above content enables a non-aqueous electrolyte secondary battery using this material as the negative electrode to have good initial efficiency and capacity maintenance rate. Even if the content of the silicon-based active material particles ranges from 90 mass % to 100 mass %, use of the inventive negative electrode active material enables high battery capacity, good cycle performance, and good first charge and discharge efficiency.

The ratio of an average diameter G of the carbon-based active material particles to an average diameter F of the silicon-based active material particles preferably satisfies 25≥G/F≥0.5. In other words, the median diameter of the carbon-based active material particles is desirably almost equal to or larger than that of the silicon-based active material particles. The reason is that the breakage of a mixture layer can be prevented when the silicon-based active material particles, which may expand or contract due to insertion or extraction of lithium at charging or discharging in battery, is equal to or smaller than the carbon-based active material particles. Thus, as the carbon-based active material particles are larger than the silicon-based active material particles, the volume density of the negative electrode, the initial efficiency, and thus the battery energy density are improved.

The negative electrode active material layer 12 shown in Table 1 may be formed by, for example, an application method. The application method is to mix the silicon-based active material particles, the binders, etc., in addition to the conductive additive and the carbon-based active material particles as needed, and disperse the resultant mixture into an organic solvent or water to apply the resultant to a subject.

[Method of Producing Negative Electrode]

The inventive method of producing a negative electrode containing the inventive negative electrode active material will be described.

The method of producing a negative electrode material contained in the negative electrode will be now described. First, a silicon compound expressed by $SiO_x$ where $0.5 \leq x \leq 1.6$ is produced. Then, the silicon compound is coated with a carbon coating. At this time, a Li compound may be formed on and/or within the silicon compound by inserting lithium into the silicon compound to modify the silicon compound.

Thereafter, a part of the silicon compound particles coated with the carbon coating is picked, and the carbon coating is separated from the picked particle to measure an X-ray diffraction spectrum and Raman spectrum. When the picked particle satisfies the requirements that the carbon coating exhibits a peak at 2θ=25.5° having a half width of 1.5° to 4.5° in the X-ray diffraction spectrum and scattering peaks at 1330 cm$^{-1}$ and 1580 cm$^{-1}$ with the intensity ratio satisfying $0.7 < I_{1330}/I_{1580} < 2.0$ in the Raman spectrum, the carbon-coated silicon compound particles from which the particle was picked are selected as the negative electrode active material particles. The particles of the silicon compound coated with the carbon coating thus selected are used for producing a negative electrode material for a non-aqueous electrolyte secondary battery.

More specifically, the negative electrode material can be produced by, for example, the following procedure.

First, a raw material (material to be vaporized) capable of generating a silicon oxide gas is heated under an inert gas atmosphere or a reduced pressure at a temperature ranging from 900° C. to 1600° C. to produce the silicon oxide gas. The raw material is a mixture of metallic silicon powder and silicon dioxide powder. The mole ratio of the mixture preferably satisfies the relation of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an adsorption plate. The temperature in the reactor is decreased to 100° C. or less and then a deposit is taken out. The deposit is pulverized with a ball mill or a jet mill to form powder.

The obtained powder material is coated with a carbon coating. Thermal CVD is desirably used to coat the obtained powder material with the carbon layer. This thermal CVD is to fill a furnace in which the powder material is placed with a hydrocarbon gas and heat the interior of the furnace. The pyrolysis temperature is preferably, but not particularly limited to, 1200° C. or less, more preferably 950° C. or less. This temperature range enables the inhibition of an unintended disproportionation of the silicon compound particles.

The thermal CVD to coat the powder material with the carbon coating can be performed, for example, while temperature in the furnace are adjusted. This adjustment allows the carbon coating on the silicon compound to have a desired ratio of the scattering peak intensity $I_{1330}/I_{1580}$ in Raman spectrum. In addition, the amount and the thickness of the carbon coating, and the ratio H/I of the bulk density H (g/cm$^3$) of the separated carbon coating to the percentage I (mass %) of carbon contained in the silicon-based active material particles can be controlled by adjusting CVD temperature and time, degree of stirring the powder material (powder of the silicon compound) during CVD. Further, the true density of the carbon coating can be controlled by adjusting a gas flow rate during CVD.

Subsequently, a part of the silicon compound particles coated with the carbon coating is picked, and the carbon coating is separated from the picked particle to measure an X-ray diffraction spectrum and Raman spectrum by, for example, the aforementioned method of separating the carbon coating, X-ray diffractometry, and Raman spectrometry. When the picked particle satisfies the requirements that the carbon coating exhibits a peak at 2θ=25.5° having a half width of 1.5° to 4.5° in the X-ray diffraction spectrum and an intensity ratio $I_{1330}/I_{1580}$ satisfying $0.7 < I_{1330}/I_{1580} < 2.0$ in the Raman spectrum, the carbon-coated silicon compound particles from which the particle was picked are selected as the negative electrode active material particles.

The selection of the silicon compound particles is not necessarily needed in every production of the negative electrode material. Once a carbon coating exhibiting a peak at 2θ=25.5° having a half width of 1.5° to 4.5° in X-ray diffraction spectrum and the intensity ratio $I_{1330}/I_{1580}$ satisfying $0.7 < I_{1330}/I_{1580} < 2.0$ is obtained, that is, once conditions under which the target particle is produced are found, future production of the negative electrode material can be performed under the found conditions.

Then, the negative electrode active material particles are mixed with a negative-electrode binder, a conductive additive, and other materials to form a negative electrode material, and an organic solvent, water, or the like is added to form slurry.

The slurry of the negative electrode material is applied to the surface of the negative-electrode current collector and dried to form a negative electrode active material layer 12 shown in Table 1. At this time, heating press may be performed, if necessary. In this manner, the negative electrode can be produced.

If a carbon-based material having a median diameter smaller than that of the silicon compound is added as the conductive additive, acetylene black, for example, can be selected.

The hydrocarbon gas preferably has a composition of $C_nH_m$ where $3 \geq n$, but is not particularly limited thereto, for this composition enables reduction in production cost and improvement in physical properties of a pyrolysis product.

<2. Lithium-Ion Secondary Battery>

A lithium-ion secondary battery using the aforementioned negative electrode, for use in a lithium-ion secondary battery, will now be described.

[Configuration of Laminate Film Secondary Battery]

Figure 3:
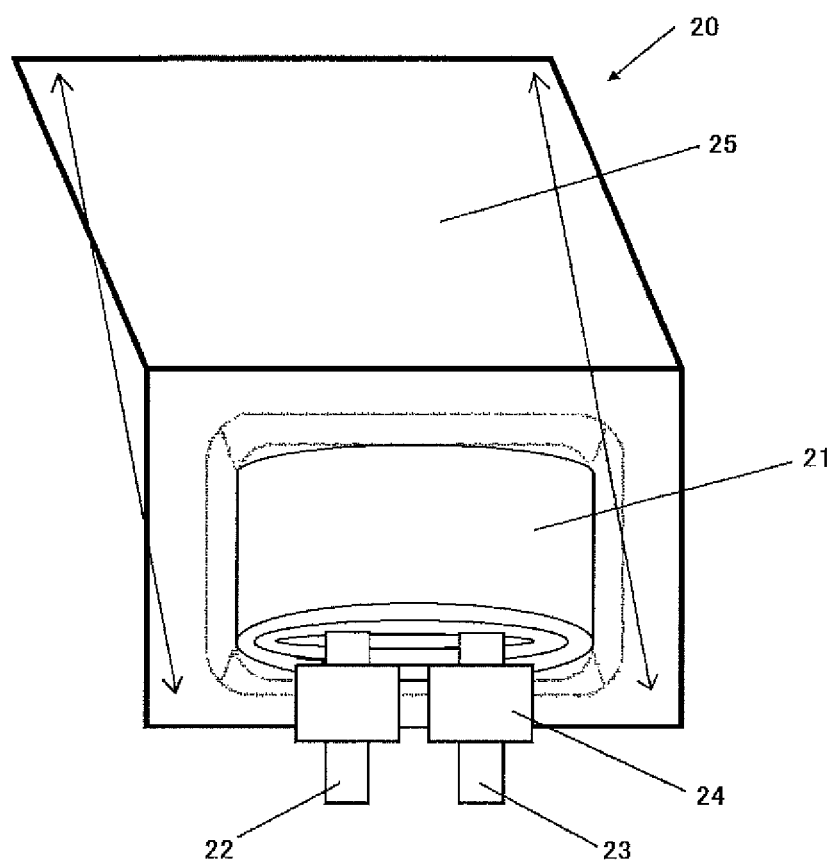
FIG. 3 is an exploded view showing an exemplary configuration of the inventive non-aqueous electrolyte secondary battery (a lithium-ion secondary battery of laminate film type)

The laminate film secondary battery 20 shown in FIG. 3 includes a wound electrode body 21 interposed between sheet-shaped outer parts 25. The wound electrode body are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive-electrode lead 22 attached to the positive electrode and a negative-electrode lead 23 attached to the negative electrode. The outermost circumference of the electrode bodies is protected by a protecting tape.

The positive-electrode lead and the negative-electrode lead, for example, extends from the interior of the outer parts 25 toward the exterior in one direction. The positive-electrode lead 22 is made of, for example, a conductive material such as aluminum; the negative-electrode lead 23 is made of, for example, a conductive material such as nickel or copper.

An example of the outer part 25 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 21. The fusion-bond layer may be, for example, a film such as a polyethylene or polypropylene film; the metallic layer aluminum foil; the protecting layer nylon.

The space between the outer parts 25 and the positive and negative electrodes is filled with close adhesion films 24 to prevent air from entering therein. Exemplary materials of the close adhesion films include polyethylene, polypropylene, and polyolefin.

[Positive Electrode]

The positive electrode has a positive electrode active material layer disposed on one side or both sides of a positive-electrode current collector as in the negative electrode 10, for examples, shown in FIG. 1.

The positive-electrode current collector is made of, for example, a conductive material such as aluminum.

The positive electrode active material layer contains a material that can occlude and emit lithium ions or the combination thereof, and may contain a binder, a conductive additive, a dispersing agent, or other materials according to design. The same detailed description as described for the negative-electrode binders and negative-electrode conductive additive, for example, is then given for this binder and this conductive additive.

The positive electrode material is preferably a compound containing lithium. Examples of this compound include a complex oxide composed of lithium and transition metal elements, and a phosphoric acid compound composed of lithium and transition metal elements. Among them, a compound including at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \leq x \leq 1.10$ and $0.05 \leq y \leq 1.10$.

Examples of the complex oxide composed of lithium and transition metal elements include a lithium cobalt complex oxide ($Li_xCoO_2$), a lithium nickel complex oxide ($Li_xNiO_2$). Examples of the phosphoric acid compound composed of lithium and transition metal elements include a lithium iron phosphoric acid compound ($LiFePO_4$), a lithium iron manganese phosphoric acid compound ($LiFe_{1-u}Mn_uPO_4$ ($u<1$)). Use of these positive electrode materials enables a higher battery capacity and excellent cycle performance.

[Negative Electrode]

The negative electrode is configured as in the above negative electrode 10 for a lithium-ion secondary battery shown in FIG. 1, and has the negative electrode active material layer 12, for example, on both faces of the current collector 11. The negative electrode preferably has a negative-electrode charge capacity larger than a battery charge capacity (electrical capacitance) provided by the positive electrode active material, for this negative electrode itself can inhibit the precipitation of lithium metal.

The positive electrode active material layer is formed partially on both faces of the positive-electrode current collector. The same is true of the negative electrode active material layer. Such a negative electrode may have, for example, an area at which the positive electrode active material layer is not present on the surface of the positive-electrode current collector that the negative electrode active material layer faces. This area permits stable battery design.

The above area at which the positive and negative electrode active material layers do not face one another, a non-facing area, is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-dimethoxyethane, and tetrahydrofuran.

Among these, ethylene carbonate, propylene carbonate, dimethyl carbonate, diethyl carbonate, or ethylmethyl carbonate, or the combination thereof is preferably used. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such a solvent improves the dissociation of electrolyte salt and ionic mobility.

The electrolyte solution preferably contains an unsaturated carbon bond cyclic carbonate as an additive, for this enables the formation of a stable coating on a negative electrode at charging and discharging and the inhibition of a decomposition reaction of the electrolyte. Examples of the unsaturated carbon bond cyclic carbonate include vinylene carbonate and vinyl ethylene carbonate.

In addition, the electrolyte solution preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolyte. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent is preferably in the range from 0.5 mol/kg to 2.5 mol/kg.

This content enables high ionic conductivity.

[Manufacture of Laminate Film Lithium-Ion Secondary Battery]

Firstly, a positive electrode is produced with the above positive electrode material as follows. A positive electrode mixture is created by mixing the positive electrode material with as necessary the binder, the conductive additive, and other materials, and dispersed in an organic solvent to form slurry of the positive-electrode mixture. This slurry is then applied to a positive-electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The compression and heating may be repeated many times.

Secondly, a negative electrode active material layer is formed on a negative-electrode current collector to produce a negative electrode through the same procedure as in the above production of the negative electrode 10 for a lithium-ion secondary battery.

The positive electrode and the negative electrode are produced in the same way as above. When these electrodes are produced, the active material layers are formed on both faces of the positive- and negative-electrode current collector. In both the electrodes, the length of these active material layers formed on the faces may differ from one another (See FIG. 1).

Finally, the following steps are carried out in the order described. An electrolyte is adjusted. With ultrasonic welding, the positive-electrode lead 22 is attached to the positive-electrode current collector and the negative-electrode lead 23 is attached to the negative-electrode current collector (See FIG. 3). The positive and negative electrodes and the separator interposed therebetween are stacked or wound to produce the electrode body and a protecting tape is stuck to the outermost circumference of the body. The electrode body is flattened. The film-shaped outer part 25 is folded in half to interpose the electrode body therebetween. The outer edge of the half parts is stuck to one another by heat sealing such that one of the four sides is opened to house the electrode body. The close adhesion films 24 are inserted between the outer part 25 and the positive- and negative-electrode leads 22, 23. The above adjusted electrolyte is introduced from the open side in a prescribed amount to perform the impregnation of the electrolyte under a vacuum. The open side is stuck by vacuum heat sealing.

In this manner, the laminate film secondary battery 20 can be produced.

EXAMPLES

The present invention will be more specifically described below with reference to examples and comparative examples, but the present invention is not restricted to these examples.

Example 1-1

The laminate film secondary battery 20 shown in FIG. 3 was produced by the following procedure.

The procedure began with the production of a positive electrode. Positive electrode active materials of 95 mass parts of $LiCoO_2$ (lithium cobalt complex oxide), 2.5 mass parts of positive-electrode conductive additive (acetylene black), and 2.5 mass parts of positive-electrode binders (polyvinylidene fluoride, PVDF) were mixed to produce a positive-electrode mixture. The positive-electrode mixture was dispersed in an organic solvent (N-methyl-2-pyrrolidone, NMP) to form paste slurry. The slurry was applied to both surfaces of a positive-electrode current collector with a coating apparatus having a die head and dried with a drying apparatus of hot-air type. The positive-electrode current collector had a thickness of 15 μm. The resultant was finally compressed with a roll press.

Secondly, a negative electrode was produced. For the production of a negative electrode active material, a mixed raw material (material to be vaporized) of metallic silicon and silicon dioxide was first placed in a reactor to obtain deposit under a vacuum of 10 Pa. The deposit was sufficiently cooled and then taken out to pulverize the deposit with a ball mill. After adjusting the particle diameter of the obtained powder, a carbon coating was formed thereon by thermal CVD. This thermal CVD was performed with a reactor of a rotary kiln type, using methane gas as carbon source, at a temperature inside the reactor of 1050° C., under a pressure of 1.0 atm, for a CVD time of 4 hours.

The produced powder was bulk-modified by the electrochemical method in a mixed solvent having a propylene-carbonate-to-ethylene-carbonate volume ratio of 1:1, including 1.3 mol/kg of lithium hexafluorophosphate ($LiPF_6$) as electrolyte salt. The resultant material was dried in a carbon dioxide atmosphere.

A part of the powder thus obtained was picked and put into a beaker made of Teflon (registered trademark), followed by adding ion-exchanged water and ethanol and stirred with a stirrer rod made of Teflon (registered trademark). Then, hydrofluoric acid was added thereto, and after stirring, nitric acid was added. While properly adding ion-exchanged water, nitric acid was further added, and the solution was allowed to stand for 3 hours. The resulting black solution was filtered to collect the separated carbon coating. The separated carbon coating was washed with water, further washed with ethanol, and dried under a vacuum at 200° C. for 10 hours. With respect to the carbon coating thus separated, X-ray diffractometry and Raman spectrometry were performed.

Figure 4:
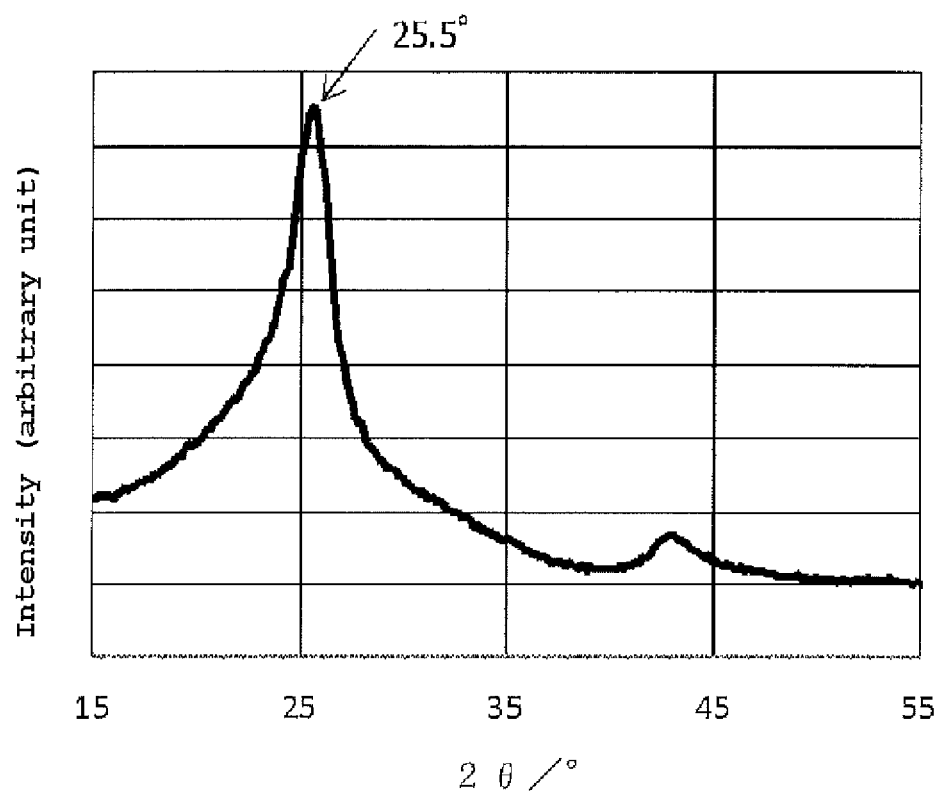
FIG. 4 is a graph showing an X-ray diffraction spectrum (Cu-Kα radiation source) measured after separating the carbon coating and the peak position at $2\theta=25.5°$ in example 1-1.

The measurement result of the separated carbon coating was as follows: the half width of the peak at $2\theta=25.5°$ was 2.7° in the X-ray diffraction spectrum; the intensity ratio of the scattering peak $I_{1330}/I_{1580}$ was 1.0 in the Raman spectrum. FIG. 4 shows the X-ray diffraction spectrum measured from the separated carbon coating.

Then, the silicon-based powder having the carbon coating was used as the silicon-based active material particles, and this silicon-based active material particles, a precursor of negative-electrode binder (polyamic acid), a first conductive additive (flaky graphite), and a second conductive additive (acetylene black) were mixed at a dry-weight ratio of 80:8:10:2. The mixture was diluted with water to form paste slurry of a negative-electrode mixture. The water was used as a solvent for the polyacrylic acid. The negative-electrode mixture slurry was then applied to both surfaces of a negative-electrode current collector with a coating apparatus and dried. The negative-electrode current collector used was an electrolytic copper foil, having a thickness of 15 μm. The resultant negative-electrode current collector was finally dried under a vacuum at 90° C. for 1 hour.

A solvent was produced by mixing 4-fluoro-1,3-dioxolan-2-one (FEC), ethylene carbonate (EC), and dimethyl carbonate (DMC) and an electrolyte salt (lithium hexafluorophosphate, $LiPF_6$) was dissolved therein to produce an electrolyte. The composite of the solvent was FEC:EC:DMC=10:20:70 in term of the volume. The content of the electrolyte salt in the solvent was 1.2 mol/kg.

The secondary battery was assembled by the following procedure. An aluminum lead was first ultrasonic-welded to one end of the positive-electrode current collector. A nickel lead was welded to one end of the negative-electrode current collector. The positive electrode, a separator, the negative electrode, a separator were then stacked in this order and wound in a longitudinal direction to obtain a wound electrode body. The end of the wounded part was fixed by a PET protecting tape. The separators were a 12-μm laminate film composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The adjusted electrolyte was poured from an open side to perform the impregnation of the electrolyte under a vacuum. The open side was stuck by heat sealing.

Examples 1-2 to 1-5, Comparative Examples 1-1 and 1-2

A secondary battery was produced as in example 1-1 except that the amount of oxygen was adjusted in the silicon compound expressed by $SiO_x$.

The silicon-based active material particles in examples 1-1 to 1-5 and comparative examples 1-1 and 1-2 had the following physical properties: the silicon compounds contained in the silicon-based active material particles had a peak area ratio A/B of 0.6 and a peak area ratio (A+B)/C of 0.32, obtained by $^{29}$Si-MAS-NMR spectrum; the silicon-based active material particles had a median diameter $D_{50}$ of 5.1 μm; the half width (2θ) of the diffraction peak attributable to an Si(111) crystal face and obtainable by X-ray diffraction of the silicon-based active material particles was 1.850; the crystallite size attributable to the Si(111) crystal face was 4.62 nm.

The silicon-based active material particles in examples 1-1 to 1-5 and comparative examples 1-1 and 1-2 also had the following properties: the amount of the carbon coating was 5%; the carbon coating had an average thickness of 110 nm; the carbon coating had an average coverage of 90%; the carbon coating had a true density of 1.6 g/cm³; the separated carbon coating exhibited a half width of the peak at 2θ=25.5° of 2.7° in X-ray diffraction spectrum and an intensity ratio of the scattering peak $I_{1330}/I_{1580}$ of 1.0 in Raman spectrum; the carbon coating exhibited fragments of $C_yH_z$ compound, where y=2, 3, 4, z=2y−3, 2y−1, and 2y+1, when subjected to TOF-SIMS; the ratio of a $C_4H_9$ detected intensity D to a $C_3H_5$ detected intensity E of the fragments of $C_yH_z$ compound exhibited by the carbon coating, D/E(Int ($C_4H_9/C_3H_5$)), was 0.8.

In addition, the carbon coating separated from the silicon-based active material particles had a bulk density H of $5.5\times10^{-2}$ g/cm³. The ratio H/I of the bulk density H to the mass percentage I of carbon contained in the silicon-based active material particles was $4.8\times10^{-1}$. The silicon-based active material particles had a specific surface area of 5.1 m²/g as measured by multipoint BET method.

The cycle performance (maintenance rate %) and the first charge and discharge efficiency (initial efficiency %) of the secondary batteries in examples 1-1 to 1-5 and comparative examples 1-1 and 1-2 were investigated. The result is given in Table 1.

The cycle performance was investigated in the following manner: First, two cycles of charging and discharging were performed at 25° C. to stabilize the battery and the discharge capacity in the second cycle was measured. Next, the cycle of charging and discharging was repeated until the total number of cycles reached 100 cycles and the discharge capacity was measured every cycle. Finally, a capacity maintenance rate % was calculated by dividing the discharge capacity in the 100-th cycle by the discharge capacity in the second cycle and multiply the resultant by 100 to express as a percent. The cycle conditions were as follows: The secondary batteries were charged with a constant current of 2.5 mA/cm² until the voltage reached 4.3V. After this voltage reached 4.3V, the charging was continued while the current density became 0.25 mA/cm² at 4.3V. The batteries were then discharged with a constant current density of 2.5 mA/cm² until the voltage reached 3.0V.

The first charge and discharge efficiency was calculated by the following expression:

Initial Efficiency (%)=(First Discharge Capacity/First Charge Capacity)×100

The atmosphere temperate was the same as the cycle performance was investigated. The charging and discharging conditions were 0.2 times the conditions of the investigation of the cycle performance. That is, the secondary batteries were charged with a constant current of 0.5 mA/cm² until the voltage reached 4.3V. After this voltage reached 4.3V, the charging was continued while the current density became 0.05 mA/cm² at 4.3V. The batteries were then discharged with a constant current density of 0.5 mA/cm² until the voltage reached 3.0V.

Tables 1 to 9 show the maintenance rate and initial efficiency of the batteries using as the negative electrode active material the silicon-based active material particles having carbon coating no carbon-based active material, such as natural graphite (having an average diameter of 20 μm, for example). In other words, the maintenance rate and initial efficiency based on the silicon-based active material particles are shown in Tables 1 to 9. This initial efficiency allowed the observation of variation in initial efficiency depending only on differences of the silicon-based active material particles or the carbon coating.

TABLE 1

NMR: A/B = 0.6, (A + B)/C = 0.32, $D_{50}$ = 5.1 μm, Si(111) half width 2θ = 1.85°, Si(111) crystallite 4.62 nm, specific surface area = $m^2/g$, carbon coating Raman $I_{1330}/I_{1580}$ = 1.0, carbon coating XRD half width = 2.7°, carbon coating bulk density = 5.5 × $10^{-2}$ $g/cm^3$, H/I = 4.8 × $10^{-1}$, carbon coating true density = 1.6 $g/cm^3$, carbon coating amount = 5%, carbon coating average thickness = 110 nm, carbon coating coverage = 90%, TOF-SIMS $C_yH_z$: y = 2, 3, 4 z = 2y − 3, 2y − 1, 2y + 1, $Int(C_4H_9/C_3H_5)$ = 0.8, FEC:EC:DMC = 1:2:7, $LIPF_6$ 1.2 mol/kg, positive electrode $LiCoO_2$, negative-electrode binder PAA, active material rate: silicon-based active material particles 100%

| Table 1 | x | Initial efficiency (%) | Maintenance rate (%) |
| --- | --- | --- | --- |
| Comparative example 1-1 | 0.3 | 75.0 | 64.4 |
| Example 1-1 | 0.5 | 72.2 | 76.8 |
| Example 1-2 | 0.7 | 70.1 | 78.2 |
| Example 1-3 | 0.9 | 68.0 | 80.1 |
| Example 1-4 | 1.2 | 67.7 | 80.1 |
| Example 1-5 | 1.6 | 67.2 | 80.2 |
| Comparative example 1-2 | 1.8 | — | — |

As shown in Table 1, the silicon compounds expressed by $SiO_x$ having an x value out of 0.5≤x≤1.6 were deteriorated in the battery performances. In comparative example 2-1, for example, although the initial efficiency was improved because of lack of the oxygen amount (x=0.3), the battery maintenance rate significantly degraded. In comparative example 2-2, on the other hand, the measurement was impossible because both the maintenance rate and initial efficiency degraded due to reduction in conductivity caused by a large amount of oxygen (x=1.8).

Examples 2-1 to 2-3, Comparative Example 2-1 to 2-3

A secondary battery was produced as in example 1-3 except that the conditions of the carbon coating on the silicon-based active material particles were adjusted so as to change the ratio of the intensity of the scattering peak at 1330 $cm^{-1}$ to that at 1580 $cm^{-1}$, $I_{1330}/I_{1580}$, in the Raman spectrum measured after separating the carbon coating and the half width of the peak at 2θ=25.5° in the X-ray diffraction spectrum measured after separating the carbon coating. The adjustment of the intensity ratio of the scattering peak $I_{1330}/I_{1580}$ and the half width of the peak at 2θ=25.5° were performed by changing CVD temperature and gas pressure during the coverage with the carbon coating through the thermal CVD.

The cycle performance and the first charge and discharge efficiency of the secondary batteries in examples 2-1 to 2-3 and comparative examples 2-1 to 2-3 were investigated. The result is given in Table 2.

TABLE 2

SiOx(x = 0.9), NMR: A/B = 0.6, (A + B)/C = 0.32, $D_{50}$ = 5.1 μm, Si(111) half width 2θ = 1.85° Si(111) crystallite 4.62 nm, specific surface area = 5.1 $m^2/g$, carbon coating bulk density = 5.5 × $10^{-2}$ $g/cm^3$, H/I = 4.8 × $10^{-1}$, carbon coating true density = 1.6 $g/cm^3$, carbon coating amount = 5%, carbon coating average thickness = 110 nm, carbon coating coverage = 90%, TOF-SIMS $C_yH_z$: y = 2, 3, 4 z = 2y − 3, 2y − 1, 2y + 1, $Int(C_4H_9/C_3H_5)$ = 0.8, FEC:EC:DMC = 1:2:7, $LIPF_6$ 1.2 mol/kg, positive electrode $LiCoO_2$, negative-electrode binder PAA, active material rate: silicon-based active material particles 100%

| Table 2 | $I_{1330}/I_{1580}$ | Half width at 2θ = 25.5° (°) | Initial efficiency (%) | Maintenance rate (%) |
| --- | --- | --- | --- | --- |
| Comparative example 2-1 | 2.1 | 1.3 | 67.1 | 71.2 |
| Example 1-3 | 1.0 | 2.7 | 68.0 | 80.1 |
| Example 2-1 | 0.96 | 4.0 | 68.2 | 77.1 |
| Example 2-2 | 0.92 | 2.0 | 68.2 | 77.1 |
| Example 2-3 | 1.9 | 1.5 | 67.3 | 72.1 |
| Comparative example 2-2 | 0.74 | 4.8 | 66.1 | 68.1 |
| Comparative example 2-3 | 0.65 | 4.3 | 60.2 | 68.4 |

As shown in Table 2, when the intensity ratio of the scattering peak $I_{1330}/I_{1580}$ is less than 2.0 in the Raman spectrum measured after separating the carbon coating, the maintenance rate and the initial efficiency were improved because the particles had few carbon components having disordered bond attributable to $I_{1330}$ on their surface and the electrical conductivity was high. When the ratio $I_{1330}/I_{1580}$ was more than 0.7, the capacity maintenance rate was improved because the particles had few carbon components such as graphite attributable to $I_{1580}$ on their surface, and the ionic conductivity and the expandability of the carbon coating corresponding to the expansion of the silicon compound due to the insertion of lithium were improved.

In addition, when the half width of the peak at 2θ=25.5° was within the range of 1.5° to 4.5° in the X-ray diffraction spectrum measured after separating the carbon coating, impregnation property of electrolyte and conductivity of the particles were properly adjusted, and the initial efficiency and the capacity maintenance rate were improved.

Examples 3-1 to 3-6

A secondary battery was produced as in example 1-3 except that the ratio of the Si components to the $SiO_2$ components (the ratio of Si to silica) in the silicon compound and the degree of disproportionation were changed. The ratio of the Si components to the $SiO_2$ components was changed in examples 3-1 to 3-6 by changing the amount of metallic silicon and silica used in production of SiO. The ratio A/B in the silicon compound ($SiO_x$) was adjusted by a heat treatment to control the degree of disproportionation, where A was the peak area of an amorphous silicon (a-Si) region represented by a chemical shift value of −20 ppm to −74 ppm, B was the peak area of a crystalline silicon (c-Si) region represented by a chemical shift value of −75 ppm to −94 ppm. The chemical shift value was obtained from a $^{29}$Si-MAS-NMR spectrum.

The cycle performance and the first charge and discharge efficiency of the secondary batteries in examples 3-1 to 3-6 were investigated. The result is given in Table 3.

TABLE 3

SiOx(x = 0.9), Si(111) half width 2θ = 1.85°, Si(111) crystallite 4.62 nm, specific surface area = 5.1 m$^2$/g, carbon coating Raman $I_{1330}/I_{1580}$ = 1.0, carbon coating XRD half width = 2.7°, carbon coating bulk density = 5.5 × 10$^{-2}$ g/cm$^3$, H/I = 4.8 × 10$^{-1}$, carbon coating true density = 1.6 g/cm$^3$, carbon coating amount = 5%, carbon coating average thickness = 110 nm, carbon coating coverage = 90%, TOF-SIMS $C_yH_z$: y = 2, 3, 4 z = 2y − 3, 2y − 1, 2y + 1, Int($C_4H_9/C_3H_5$) = 0.8, FEC:EC:DMC = 1:2:7, LiPF$_6$ 1.2 mol/kg, positive electrode LiCoO$_2$, negative-electrode binder PAA, active material rate: silicon-based active material particles 100%

| Table 3 | NMR A(a-Si)/B(c-Si) | (A + B)/C(SiO2) | Initial efficiency (%) | Maintenance rate (%) |
|---|---|---|---|---|
| Example 3-1 | 0.3 | 6.2 | 69.2 | 76.5 |
| Example 3-2 | 0.002 | 1.5 | 67.1 | 78.8 |
| Example 1-3 | 0.6 | 0.32 | 68.0 | 80.1 |
| Example 3-3 | 0.769 | 0.32 | 67.7 | 80.3 |
| Example 3-4 | 1.6 | 0.33 | 67.2 | 80.0 |
| Example 3-5 | 5.5 | 0.42 | 68.5 | 77.3 |
| Example 3-6 | 0.54 | 0.01 | 66.2 | 76.9 |

As shown in Table 3, examples 1-3, 3-3, and 3-4, which satisfied 5.0≥A/B≥0.01 and 6.0≥(A+B)/C≥0.02 demonstrated that both the maintenance rate and initial efficiency were better. The reason is that an increase in a-Si component reduced the initial efficiency and improved the maintenance rate, thereby balancing the rate within the range of 5.0≥A/B≥0.01. The ratio of the Si components to the SiO$_2$ components, (A+B)/C, of 6 or less enables improvement in the maintenance rate since the expansion due to the insertion of lithium can be inhibited. Moreover, the ratio (A+B)/C of 0.02 or more enables conductivity and thus the maintenance rate and initial efficiency to be improved. Examples 3-1 and 3-6, which satisfied only 5.0≥A/B≥0.01, were slightly inferior in the maintenance rate to the examples in which both A/B and (A+B)/C were in the above ranges. Examples 3-2 and 3-5, which satisfied only 6.0≥(A+B)/C≥0.02, were slightly inferior in the maintenance rate to the examples in which both A/B and (A+B)/C were in the above ranges.

Examples 4-1 to 4-5

A secondary battery was produced as in example 1-3 except that the crystallinity of the silicon compound was changed. The crystallinity can be adjusted by a heat treatment under a non-atmospheric condition. Although Example 4-1 exhibits a crystallite size of 1.542, this value was obtained by fitting with analysis software because the peak value was not obtained. The silicon compound in examples 4-1 was substantially amorphous.

The cycle performance and the first charge and discharge efficiency of the secondary batteries in examples 4-1 to 4-5 were investigated. The result is given in Table 4.

TABLE 4

SiOx(x = 0.9), NMR: A/B = 0.6, (A + B)/C = 0.32, D$_{50}$ = 5.1 μm, Si(111) half width 2θ = 1.85°, Si(111) crystallite 4.62 nm, specific surface area = 5.1 m$^2$/g, carbon coating Raman $I_{1330}/I_{1580}$ = 1.0, carbon coating XRD half width = 2.7°, carbon coating bulk density = 5.5 × 10$^{-2}$ g/cm$^3$, H/I = 4.8 × 10$^{-1}$, carbon coating true density = 1.6 g/cm$^3$, carbon coating amount = 5%, carbon coating average thickness = 110 nm, carbon coating coverage = 90%, TOF-SIMS $C_yH_z$: y = 2, 3, 4 z = 2y − 3, 2y − 1, 2y + 1, Int($C_4H_9/C_3H_5$) = 0.8, FEC:EC:DMC = 1:2:7, LiPF$_6$ 1.2 mol/kg, positive electrode LiCoO$_2$, negative-electrode binder PAA, active material rate: silicon-based active material particles 100%

| Table 4 | Si(111) half width (°) | Si(111) crystallite size (nm) | Initial efficiency (%) | Maintenance rate (%) |
|---|---|---|---|---|
| Example 4-1 | 10.123 | 1.542 | 67.7 | 80.5 |
| Example 4-2 | 2.257 | 3.77 | 67.8 | 80.4 |
| Example 1-3 | 1.845 | 4.62 | 68.0 | 80.1 |
| Example 4-3 | 1.271 | 6.63 | 68.2 | 79.7 |
| Example 4-4 | 0.796 | 10.84 | 68.3 | 79.2 |
| Example 4-5 | 0.756 | 11.42 | 68.6 | 78.8 |

As shown in Table 4, the capacity maintenance rate and initial efficiency changed in response to the variation in the crystallinity of the silicon compound. In particular, a high maintenance rate was obtained by low crystallinity materials with a crystallite size of 7.5 nm or less, which is attributable to an Si(111) face. The best maintenance rate was obtained when the silicon compound was amorphous. Although the initial efficiency was reduced as the crystallinity was lowered, this presents little problem of the initial efficiency.

Examples 5-1 to 5-5

A secondary battery was produced as in example 1-3 except that the conditions of the thermal CVD was adjusted to change the ratio H/I of the bulk density H of the separated carbon coating to the mass percentage I of carbon contained in the silicon-based active material particles. The ratio H/I of the bulk density H of the separated carbon coating to the mass percentage I of carbon contained in the silicon-based active material particles was changed by adjusting the CVD temperature, time, degree of stirring the powder material (silicon compound powder) during CVD, and a CVD gas flow rate.

The cycle performance and the first charge and discharge efficiency of the secondary batteries in examples 5-1 to 5-5 were investigated. The result is given in Table 5.

TABLE 5

SiOx(x = 0.9), NMR: A/B = 0.6, (A + B)/C = 0.32, D$_{50}$ = 5.1 μm, Si(111) half width 2θ = 1.85°, Si(111) crystallite 4.62 nm, specific surface area = 5.1 m$^2$/g, carbon coating Raman $I_{1330}/I_{1580}$ = 1.0, carbon coating XRD half width = 2.7°, carbon coating true density = 1.6 g/cm$^3$, carbon coating amount = 5%, carbon coating average thickness = 110 nm, carbon coating coverage = 90%, TOF-SIMS $C_yH_z$: y = 2, 3, 4 z = 2y − 3, 2y − 1, 2y + 1, Int($C_4H_9/C_3H_5$) = 0.8, FEC:EC:DMC = 1:2:7, LiPF$_6$ 1.2 mol/kg, positive electrode LiCoO$_2$, negative-electrode binder PAA, active material rate: silicon-based active material particles 100%

| Table 5 | Bulk density H of carbon coating (g/cm$^3$) | H/I | Initial efficiency (%) | Maintenance rate (%) |
|---|---|---|---|---|
| Example 1-3 | 5.5 × 10$^{-2}$ | 4.8 × 10$^{-1}$ | 68.0 | 80.1 |
| Example 5-1 | 8.2 × 10$^{-2}$ | 4.1 × 10$^{-1}$ | 68.2 | 79.8 |
| Example 5-2 | 2.6 × 10$^{-2}$ | 3.7 × 10$^{-1}$ | 67.4 | 80.3 |
| Example 5-3 | 2.9 × 10$^{-2}$ | 5.8 × 10$^{-1}$ | 68.0 | 80.2 |

TABLE 5-continued

SiOx(x = 0.9), NMR: A/B = 0.6, (A + B)/C = 0.32, $D_{50}$ = 5.1 μm,
Si(111) half width 2θ = 1.85°, Si(111) crystallite 4.62 nm, specific
surface area = 5.1 m²/g, carbon coating Raman $I_{1330}/I_{1580}$ = 1.0,
carbon coating XRD half width = 2.7°, carbon coating true
density = 1.6 g/cm³, carbon coating amount = 5%, carbon coating
average thickness = 110 nm, carbon coating coverage = 90%, TOF-
SIMS $C_yH_z$: y = 2, 3, 4 z = 2y − 3, 2y − 1, 2y + 1, Int($C_4H_9/C_3H_5$) =
0.8, FEC:EC:DMC = 1:2:7, $LIPF_6$ 1.2 mol/kg, positive electrode
$LiCoO_2$, negative-electrode binder PAA, active material rate:
silicon-based active material particles 100%

| Table 5 | Bulk density H of carbon coating (g/cm³) | H/I | Initial efficiency (%) | Maintenance rate (%) |
|---|---|---|---|---|
| Example 5-4 | 3.1 × 10⁻¹ | 6.2 × 10⁻² | 66.1 | 77.2 |
| Example 5-5 | 8.7 × 10⁻³ | 1.7 × 10⁻³ | 65.5 | 78.1 |

As shown in Table 5, when the separated carbon coating had a bulk density ranging from $1.0 \times 10^{-2}$ g/cm³ to $1.2 \times 10^{-1}$ g/cm³, the electronic conductivity was proper at charging and discharging, and thus the precipitation of lithium hardly occurred and the conductivity of the negative electrode easily became uniform. Consequently, the maintenance rate and the initial efficiency were improved. When the ratio H/I of the bulk density H of the separated carbon coating to the mass percentage I of carbon contained in the silicon-based active material particles was within the range of $1.0 \times 10^{-1}$ g/cm³ to 1.0 g/cm³, a binder could be appropriately adsorbed to the surface of the silicon-based active material particles, and thus the initial efficiency and the capacity maintenance rate were improved.

Examples 6-1 to 6-10

A secondary battery was produced as in example 1-3 except that the specific surface area of the silicon-based active material particles and the amount, average thickness, average coverage, and average density of the carbon coating were changed. The specific surface area of the silicon-based active material particles and the amount, thickness, coverage, and density of the carbon coating could be controlled by adjusting the CVD temperature, time, and degree of stirring the silicon compound powder during the CVD.

The cycle performance and the first charge and discharge efficiency of the secondary batteries in examples 6-1 to 6-10 were investigated. The result is given in Table 6.

TABLE 6

SiOx(x = 0.9), NMR: A/B = 0.6, (A + B)/C = 0.32, $D_{50}$ = 5.1 μm, Si(111) half width 2θ = 1.85°,
Si(111) crystallite 4.62 nm, carbon coating Raman $I_{1330}/I_{1580}$ = 1.0,
carbon coating XRD half width = 2.7°, carbon coating bulk density = 5.5 × 10⁻² g/cm³,
H/I = 4.8 × 10⁻¹, TOF-SIMS $C_yH_z$: y = 2, 3, 4 z = 2y − 3, 2y − 1, 2y + 1, Int ($C_4H_9/C_3H_5$) = 0.8,
FEC:EC:DMC = 1:2:7, $LIPF_6$ 1.2 mol/kg, positive electrode $LiCoO_2$, negative-electrode binder PAA,
active material rate: silicon-based active material particles 100%

| | Amount (mass %) | Carbon coating average thickness (nm) | Average coverage (%) | Average true density (g/cm³) | Specific surface area of negative electrode active material particles (m²/g) | Initial efficiency (%) | Maintenance rate (%) |
|---|---|---|---|---|---|---|---|
| Example 1-3 | 5 | 80 | 90% | 1.6 | 5.1 | 68.0 | 80.1 |
| Example 6-1 | 7.5 | 120 | 70% | 2.05 | 0.7 | 67.2 | 72.2 |
| Example 6-2 | 10 | 310 | 100% | 1.1 | 30 | 65.1 | 70.1 |
| Example 6-3 | 2 | 50 | 25% | 1.6 | 4 | 66.5 | 71.3 |
| Example 6-4 | 2 | 40 | 20% | 1.7 | 2.2 | 68.7 | 68.1 |
| Example 6-5 | 6 | 125 | 97% | 1.6 | 4.3 | 68.5 | 73.6 |
| Example 6-6 | 10 | 220 | 100% | 1.6 | 5.5 | 67.8 | 80.1 |
| Example 6-7 | 20 | 420 | 100% | 1.6 | 9 | 68.2 | 78.6 |
| Example 6-8 | 20 | 420 | 100% | 1.6 | 15 | 68.3 | 76.3 |
| Example 6-9 | 30 | 600 | 100% | 1.6 | 17 | 67.2 | 73.5 |
| Example 6-10 | 50 | 650 | 100% | 1.6 | 20 | 65.1 | 68.9 |

As shown in Table 6, when the amount of the carbon coating was from 0.1 mass % to 25 mass %, particularly from 4 mass % to 20 mass %, both the maintenance rate and initial efficiency were better. The carbon coating amount of 0.1 mass % or more was sufficient to improve the electronic conductivity of the silicon-based active material particles. The carbon coating amount of 25 mass % or less was appropriate to improve the ionic conductivity. When the thickness of the carbon coating was from 5 nm to 500 nm, sufficient conductivity could be obtained, and the proportion of the silicon compound could be increased.

When the average coverage of the carbon coating was 30% or more, the carbon components effectively improved the conductivity. When the true density of the carbon coating was 1.9 g/cm³ or less, the carbon coating on the silicon compound was not excessively dense. Therefore, the electrolyte could be easily penetrated into the internal silicon compound, and the battery performances such as the cycle performance and the first charge and discharge efficiency were improved. When the true density was 1.2 g/cm³ or more, the silicon-based active material particle had a proper specific surface area. Therefore, the binder was adsorbed thereto with a proper amount to improve the effect of the binder, and the battery performances were improved. When the specific surface area of the silicon-based active material particle was within the above range, the battery using this particles had excellent binding property and impregnation property of an electrolyte, and the battery performances were improved.

Examples 7-1 to 7-5, Comparative Example 7-1

A secondary battery was produced as in example 1-3 except that the conditions of the carbon coating on the silicon compound were adjusted. More specifically, examples 7-1 to 7-5 changed $C_yH_z$ fragments exhibited by the carbon coating through TOF-SIMS and the ratio D/E where D was the $C_4H_9$ detected intensity and E was the $C_3H_5$ detected intensity in TOF-SIMS. This change was performed by adjusting the CVD temperature, gas species used when the silicon compound was subjected to the CVD, and temperature during the post-CVD treatment. In comparative example 7-1, the silicon compound was not coated with a carbon coating.

The cycle performance and the first charge and discharge efficiency of the secondary batteries in examples 7-1 to 7-5 and comparative example 7-1 were investigated. The result is given in Table 7.

TABLE 7

SiOx(x = 0.9), NMR: A/B = 0.6, (A + B)/C = 0.32, $D_{50}$ = 5.1 μm, Si(111) half width 2θ = 1.85°,
Si(111) crystallite 4.62 nm, specific surface area = 5.1 m²/g, carbon coating Raman $I_{1330}/I_{1580}$ = 1.0,
carbon coating XRD half width = 2.7°, carbon coating bulk density = 5.5 × $10^{-2}$ g/cm³, H/I = 4.8 × $10^{-1}$,
carbon coating true density = 1.6 g/cm³, carbon coating amount = 5%, carbon coating average thickness = 110 nm,
carbon coating coverage = 90%, FEC:EC:DMC = 1:2:7, $LIPF_6$ 1.2 mol/kg, positive electrode $LiCoO_2$,
negative-electrode binder PAA, active material rate: silicon-based active material particles 100%

| | CyHz fragment | | | Carbon coating coverage condition | | Carbon coating amount (%) | Initial efficiency (%) | Maintenance rate (%) |
|---|---|---|---|---|---|---|---|---|
| | y | z | D/E | CVD gas | CVD temperature | Post-CVD treatment | | | |
| Comparative example 7-1 | — | — | — | — | — | — | 0 | 58.2 | 61.3 |
| Example 1-3 | 2, 3, 4 | 2y − 1, 2y + 1, 2y + 3 | 0.8 | methane | 1050° C. | 1000° C. firing | 5 | 68 | 80.1 |
| Example 7-1 | 2, 3, 4 | 2y − 2, 2y, 2y + 2 | 0.8 | methane | 1000° C. | 1150° C. firing | 5 | 67.9 | 78.2 |
| Example 7-2 | 2, 3, 4, 5 | 2y − 2, 2y, 2y + 2 | 0.65 | propane | 900° C. | — | 5 | 67.7 | 79.8 |
| Example 7-3 | 2, 3, 4, 5, 6 | 2y − 2, 2y, 2y + 2 | 0.58 | butadiene | 900° C. | — | 5 | 66.8 | 78.5 |
| Example 7-4 | 2, 3, 4, 5 | 2y − 2, 2y, 2y + 2 | 1.2 | ethylene | 900° C. | — | 5 | 65.2 | 77 |
| Example 7-5 | 2, 3, 4, 5 | 2y − 2, 2y, 2y + 2 | 2.6 | methane | 850° C. | — | 5 | 64.1 | 76.8 |

As shown in Table 7, when fragments of $C_yH_z$ compound were detected with the relationship satisfying 2.5≥D/E≥0.3, the battery performances were improved. Meanwhile, when the carbon coating was not formed like comparative example 7-1, electronic conductivity was degraded in the negative electrode, and thus the maintenance rate and the initial efficiency were degraded. Moreover, when fragments of $C_yH_z$ compound satisfying 6≥y≥2 and 2y+2≥z≥2y−2 were detected, the battery performances were improved. In particular, when y-value was small, in other words, when only fragments of $C_yH_z$ compound where y=2, 3, 4 were detected, the battery performances were much more improved.

Examples 8-1 to 8-5

A secondary battery was produced as in example 1-3 except that the median diameter of the silicon compound was adjusted. The median diameter was adjusted by changing pulverization time and classification conditions in production of the silicon compound. The cycle performance, first charge and discharge efficiency, that is SiO initial efficiency (%) of the secondary batteries in examples 8-1 to 8-5 were investigated. The result is given in Table 8.

TABLE 8

SiOx(x = 0.9), NMR: A/B = 0.6, (A + B)/C = 0.32, Si(111) half width
2θ = 1.85°, Si(111) crystallite 4.62 nm, specific surface area = 5.1 m$^2$/g,
carbon coating Raman $I_{1330}/I_{1580}$ = 1.0, carbon coating XRD half width =
2.7°, carbon coating bulk density = 5.5 × 10$^{-2}$ g/cm$^3$, H/I = 4.8 × 10$^{-1}$,
carbon coating true density = 1.6 g/cm$^3$, carbon coating amount = 5%,
carbon coating average thickness = 110 nm, carbon coating coverage =
90%, TOF-SIMS $C_yH_z$: y = 2, 3, 4 z = 2y − 3, 2y − 1, 2y + 1,
Int ($C_4H_9/C_3H_5$) = 0.8, FEC:EC:DMC = 1:2:7, LiPF$_6$ 1.2 mol/kg,
positive electrode LiCoO$_2$, negative-electrode binder PAA, active
material rate: silicon-based active material particles 100%

| Example 8 | Median diameter (μm) | Initial efficiency (%) | Maintenance rate (%) |
|---|---|---|---|
| Example 8-1 | 0.3 | 67.2 | 77.1 |
| Example 8-2 | 1.3 | 67.6 | 79.8 |
| Example 1-3 | 5.1 | 68 | 80 |
| Example 8-3 | 8.1 | 67.8 | 79.9 |
| Example 8-4 | 12.3 | 67.4 | 79.1 |
| Example 8-5 | 31.1 | 66.9 | 77.6 |

As shown in Table 8, the maintenance rate and initial efficiency changed in response to the variation in the median diameter of the silicon compound. Examples 8-1 to 8-4 demonstrated that the maintenance rate was higher when the median diameter of the silicon compound was within the range of 0.5 μm to 20 μm. In particular, a better maintenance rate was obtained when the median diameter was within the range of 0.5 μm to 12 μm.

Examples 9-1 and 9-2

A secondary battery was produced as in example 1-3 except that the silicon compound was doped with lithium so that at least a part of the silicon-based active material particles contained lithium. Li-doping was performed by the thermal doping method in example 9-1, and by the electrochemical method in example 9-2.

The cycle performance and the first charge and discharge efficiency of the secondary batteries in examples 9-1 and 9-2 were investigated. The result is given in Table 9.

TABLE 9

SiOx(x = 0.9), carbon coating Raman $I_{1330}/I_{1580}$ = 1.0, carbon
coating XRD half width = 2.7°, carbon coating bulk density =
5.5 × 10$^{-2}$ g/cm$^3$, $D_{50}$ = 5.1 μm, specific surface area = 5.1 m$^2$/g,
H/I = 4.8 × 10$^{-1}$, carbon coating true density = 1.6 g/cm$^3$, carbon
coating amount = 5%, carbon coating average thickness = 110 nm,
carbon coating coverage = 90%, TOF-SIMS $C_yH_z$: y = 2, 3, 4 z =
2y − 3, 2y − 1, 2y + 1, Int($C_4H_9/C_3H_5$) = 0.8, FEC:EC:DMC =
1:2:7, LiPF$_6$ 1.2 mol/kg, positive electrode LiCoO$_2$, negative-
electrode binderPAA, active material rate: silicon-based active
material particles 100%

| Table 9 | Li-doping method | Initial efficiency (%) | Maintenance rate (%) |
|---|---|---|---|
| Example 1-3 | — | 68 | 80 |
| Example 9-1 | Thermal doping method | 74.1 | 78.8 |
| Example 9-2 | Electrochemical modification method | 76.2 | 81.1 |

As shown in Table 9, when the silicon-based active material particles contained lithium, the maintenance rate was improved. In addition, when the silicon-based active material particles were doped with lithium by the electrochemical modification method as in example 9-2, the initial efficiency was particularly improved. Further, since the initial efficiency of the negative electrode was increased in the non-aqueous electrolyte secondary battery using this particles, unbalance between the positive electrode and the negative electrode was inhibited, thereby improving the maintenance rate.

Examples 10-1 and 10-6

In examples 10-1 and 10-6, a secondary battery was produced in the almost same manner as in example 1-3 except that carbon-based active material particles (mixture of synthetic graphite and natural graphite with mass ratio of 1:1) were added to the negative electrode material, the mass ratio of the silicon-based active materials to the carbon-based active material particles in the negative electrode (or the mass ratio of the silicon-based active material particles (silicon oxide) to the entire negative electrode active material) was changed, and the binder was accordingly changed. In examples 10-1 to 10-3, a mixture of styrene-butadiene rubber (represented by SBR in Table 10) and CMC was used as the binder. In examples 10-4 to 10-6, polyimide (represented by PI in Table 10) was used as the binder.

Comparative Example 10-1

A secondary battery was produced as in example 1-3 except that silicon-based active material particles were not contained, carbon-based active material particles, which were also used in examples 10-1 and 10-6, alone were used as the negative electrode active material, and a lithium nickel cobalt aluminum complex oxide was used as the positive electrode material.

The cycle performance and the first charge and discharge efficiency of the secondary batteries in examples 10-1 to 10-6 and comparative example 10-1 were investigated. In addition, the battery capacity density (mAh/cm$^3$) in examples 10-1 to 10-6 and comparative example 10-1 was measured, and relative battery capacity density was each calculated on the basis of the battery capacity density in comparative example 10-1. The result is given in Table 10.

TABLE 10

SiOx(x = 0.9), NMR: A/B = 0.6, (A + B)/C = 0.32, $D_{50}$ = 5.1 μm,
Si(111) half width 2θ = 1.85°, Si(111) crystallite 4.62 nm, specific
surface area = 5.1 m$^2$/g, carbon coating Raman $I_{1330}/I_{1580}$ = 1.0, carbon
coating XRD half width = 2.7°, carbon coating bulk density = 5.5 ×
10$^{-2}$g/cm$^3$, H/I = 4.8 × 10$^{-1}$, carbon coating true density = 1.6 g/cm$^3$,
carbon coating amount = 5%, carbon coating average thickness =
110 nm, carbon coating coverage = 90%, TOF-SIMS $C_yH_z$: y = 2, 3,
4 z = 2y − 3, 2y − 1, 2y + 1, Int($C_4H_9/C_3H_5$) = 0.8, FEC:EC:DMC =
1:2:7, LiPF$_6$ 1.2 mol/kg, positive electrode LiCoO$_2$

| Table 10 | Proportion of silicon-based active material particles (mass %) | Relative battery capacity density | Maintenance rate (%) | Initial efficiency (%) | Binder |
|---|---|---|---|---|---|
| Comparative example 10-1 | 0 | 1 | 94.1 | 89.8 | SBR/CMC |
| Example 10-1 | 4 | 1.03 | 90.3 | 85.7 | SBR/CMC |
| Example 10-2 | 5 | 1.04 | 90 | 84.9 | SBR/CMC |
| Example 10-3 | 10 | 1.08 | 87 | 81.5 | SBR/CMC |
| Example 10-4 | 25 | 1.13 | 86.2 | 75.7 | PI |
| Example 10-5 | 50 | 1.17 | 85.3 | 71.4 | PI |
| Example 10-6 | 100 | 1.18 | 84.9 | 68 | PI |

As shown in Table 10, as the proportion of silicon-based active material particles was increased, the capacity of the negative electrode increased and the initial efficiency and maintenance rate were decreased. In Table 10, the relative battery capacity density was based on the battery capacity density in comparative example 10-1, in which the proportion of the silicon-based active material particles was 0, NCA (lithium nickel cobalt aluminum complex oxide) was used as the positive electrode material, and the discharging cutoff voltage in the battery was 2.5 V, as mentioned above. When the proportion of the silicon-based active material particles was reduced, the initial efficiency and the maintenance rate were improved and the battery capacity density was decreased. In particular, comparative example 10-1, in which the carbon-based active material alone was used as the negative electrode material, failed to obtain a lithium-ion secondary battery having a higher battery capacity density. Especially, when the amount of the silicon-based active material particles was 5 mass % or more, the battery capacity density was sufficiently improved.

Examples 11-1 and 11-8

A secondary battery was produced as in example 10-2 except that the average diameter G of the carbon-based active material (median diameter $D_{50}$ of the carbon-based active material) and the average diameter F of the silicon-based active material (median diameter $D_{50}$ of the silicon-based active material) in the negative electrode active material layer, and thus the ratio G/F was changed.

The cycle performance and the first charge and discharge efficiency of the secondary batteries in examples 11-1 to 11-8 were investigated. The result is given in Table 11.

TABLE 11

SiOx(x = 0.9), NMR: A/B = 0.6, (A + B)/C = 0.32, Si(111) half width 2θ = 1.85°, Si (111) crystallite 4.62 nm, specific surface area = 5.1 m²/g, carbon coating Raman $I_{1330}/I_{1580}$ = 1.0, carbon coating XRD half width = 2.7°, carbon coating bulk density = 5.5 × $10^{-2}$ g/cm³, H/I = 4.8 × $10^{-1}$, carbon coating true density = 1.6 g/cm³, carbon coating amount = 5%, carbon coating average thickness = 110 nm, carbon coating coverage = 90%, TOF-SIMS $C_yH_z$: y = 2, 3, 4 z = 2y − 3, 2y − 1, 2y + 1, Int($C_4H_9/C_3H_5$) = 0.8, FEC:EC:DMC = 1:2:7, LIPF₆ 1.2 mol/kg, positive electrode LiCoO₂ negative-electrode binder CMC/SBR, active material rate: silicon-based active material particles 5%

| Table 11 | F (μm) | G (μm) | G/F | Initial efficiency (%) | Maintenance rate (%) |
|---|---|---|---|---|---|
| Example 11-1 | 0.5 | 40 | 80 | 80.4 | 83.6 |
| Example 10-2 | 4 | 20 | 5 | 84.9 | 90 |
| Example 11-2 | 4 | 16 | 4 | 84.8 | 90 |
| Example 11-3 | 4 | 12 | 3 | 84.5 | 88.8 |
| Example 11-4 | 4 | 8 | 2 | 84.1 | 88.5 |
| Example 11-5 | 4 | 4 | 1 | 83.5 | 87.8 |
| Example 11-6 | 4 | 2 | 0.5 | 83.2 | 87.8 |
| Example 11-7 | 12 | 4 | 0.33 | 80.5 | 84.4 |
| Example 11-8 | 8 | 16 | 2 | 82.2 | 87.8 |

As shown in Table 11, the size of the carbon-based active material particles in the negative electrode active material layer was preferably equal to or larger than that of the silicon-based active material particles. In other words, G/F≥0.5 is preferable. When the silicon compound, which was expandable and contractible, was equal to or smaller than the carbon-based negative electrode material, the breakage of the mixture layer could be prevented. When the carbon-based negative electrode material was larger than the silicon compound, the volume density of the negative electrode at charging, the initial efficiency, and thus the battery energy density were improved. In particular, the range of 25≥G/F≥0.5 enabled the initial efficiency and the maintenance rate to be more improved.

Examples 12-1 to 12-4

A secondary battery was produced as in example 10-2 except that the kind of the carbon-based active material particles was changed as shown in Table 12.

The cycle performance and the first charge and discharge efficiency of the secondary batteries in examples 12-1 to 12-4 were investigated. The result is given in Table 12.

TABLE 12

SiOx(x = 0.9), NMR: A/B = 0.6, (A + B)/C = 0.32, $D_{50}$ = 5.1 μm, Si(111) half width 2θ = 1.85°, Si(111) crystallite 4.62 nm, specific surface area = 5.1 m²/g, carbon coating Raman $I_{1330}/I_{1580}$ = 1.0, carbon coating XRT half width = 2.7°, carbon coating bulk density = 5.5 × $10^{-2}$ g/cm³, H/I = 4.8 × $10^{-1}$, carbon coating true density = 1.6 g/cm³, carbon coating amount = 5%, carbon coating average thickness = 110 nm, carbon coating coverage = 90%, TOF-SIMS $C_yH_z$: y = 2, 3, 4 z = 2y − 3, 2y − 1, 2y + 1, Int($C_4H_9/C_3H_5$) = 0.8, FEC:EC:DMC = 1:2:7, LIPF₆ 1.2 mol/kg, positive electrode LiCoO₂ negative-electrode binder CMC/SBR, active material rate: silicon-based active material particles 5%

| Table 12 | types of Carbon-based active material | Initial efficiency (%) | Maintenance rate (%) |
|---|---|---|---|
| Example 12-1 | Synthetic graphite | 86 | 88.1 |
| Example 12-2 | Natural graphite | 83.8 | 90.3 |
| Example 10-2 | Synthetic graphite, Natural graphite (mass ratio 1:1) | 84.9 | 90 |
| Example 12-3 | Hard carbon, Natural graphite (mass ratio 1:1) | 81.3 | 87.1 |
| Example 12-4 | Synthetic graphite, Soft carbon (mass ratio 1:1) | 80.4 | 86.5 |

As shown in Table 12, graphite material such as synthetic graphite and natural graphite is preferably contained as the carbon-based active material particles in the negative electrode active material layer. The reason is that the battery performances are relatively improved when the negative electrode is produced by mixing a graphite material with the silicon-based active material particles since the graphite material enables high initial efficiency and maintenance rate.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A negative electrode active material for a non-aqueous electrolyte secondary battery, comprising negative electrode active material particles containing a silicon compound expressed by $SiO_x$ where 0.5≤x≤1.6, the negative electrode active material particles at least partially coated with a carbon coating, the carbon coating exhibiting a peak at 2θ=25.5° having a half width of 1.5° to 4.5° in an X-ray diffraction spectrum measured after separating the carbon coating from the negative electrode active material particles, the carbon coating exhibiting scattering peaks at 1330 cm⁻¹ and 1580 cm⁻¹ in Raman spectrum obtained by Raman spectrometry measured after separating the carbon coating from the negative electrode active material particles, wherein a ratio of an intensity of the scattering peak at 1330 cm$^{-1}$ to that at 1580 cm$^{-1}$ satisfies $0.7<I_{1330}/I_{1580}<2.0$.

2. The negative electrode active material for a non-aqueous electrolyte secondary battery according to claim 1, wherein an amount of the carbon coating is within a range of 0.1 mass % to 25 mass % with respect to the negative electrode active material particles.

3. The negative electrode active material for a non-aqueous electrolyte secondary battery according to claim 1, wherein the carbon coating has a true density ranging from 1.2 g/cm$^3$ to 1.9 g/cm$^3$.

4. The negative electrode active material for a non-aqueous electrolyte secondary battery according to claim 1, wherein the carbon coating exhibits a bulk density ranging from $1.0 \times 10^{-2}$ g/cm$^3$ to $1.2 \times 10^{-1}$ g/cm$^3$ when the carbon coating is separated from the negative electrode active material particles.

5. The negative electrode active material for a non-aqueous electrolyte secondary battery according to claim 1, wherein H/I ranges from $1.0 \times 10^{-1}$ g/cm$^3$ to 1.0 g/cm$^3$, where H (g/cm$^3$) is a bulk density of the carbon coating separated from the negative electrode active material particles and I (mass %) is a mass percentage of carbon contained in the negative electrode active material particles to that of the negative electrode active material particles.

6. The negative electrode active material for a non-aqueous electrolyte secondary battery according to claim 1, wherein the separation of the carbon coating is performed by reacting the negative electrode active material particles with a solution containing hydrofluoric acid and nitric acid and removing the silicon compound from the negative electrode active material particles.

7. The negative electrode active material for a non-aqueous electrolyte secondary battery according to claim 1, wherein the carbon coating exhibits fragments of $C_yH_z$ compound when subjected to Time-of-Flight Secondary Ion Mass Spectrometry (TOF-SIMS), and a part of the fragments of $C_yH_z$ compound satisfies $6 \geq y \geq 2$ and $2y+2 \geq z \geq 2y-2$.

8. The negative electrode active material for a non-aqueous electrolyte secondary battery according to claim 7, wherein a ratio of a $C_4H_9$ detected intensity D to a $C_3H_5$ detected intensity E of the fragments of $C_yH_z$ compound exhibited by the carbon coating during the TOF-SIMS satisfies $2.5 \geq D/E \geq 0.3$.

9. The negative electrode active material for a non-aqueous electrolyte secondary battery according to claim 1, wherein the negative electrode active material particles have a specific surface area ranging from 1.0 m$^2$/g to 15 m$^2$/g.

10. The negative electrode active material for a non-aqueous electrolyte secondary battery according to claim 1, wherein an average thickness of the carbon coating is within a range from 5 nm to 500 nm.

11. The negative electrode active material for a non-aqueous electrolyte secondary battery according to claim 1, wherein an average coverage of the carbon coating is 30% or more.

12. The negative electrode active material for a non-aqueous electrolyte secondary battery according to claim 1, wherein the carbon coating is formed by pyrolizing a compound containing carbon.

13. The negative electrode active material for a non-aqueous electrolyte secondary battery according to claim 1, wherein the silicon compound satisfies formula (1) of $5.0 \geq A/B \geq 0.01$ and $6.0 \geq (A+B)/C \geq 0.02$ where A is a peak area of an amorphous silicon region represented by a chemical shift value of −20 ppm to −74 ppm, B is a peak area of a crystalline silicon region represented by a chemical shift value of −75 ppm to −94 ppm, and C is a peak area of a silica region represented by a chemical shift value of −95 ppm to −150 ppm, the chemical shift value being obtained from a $^{29}$Si-Magic Angle Spinning (MAS)-Nuclear Magnetic Resonance (NMR) spectrum.

14. The negative electrode active material for a non-aqueous electrolyte secondary battery according to claim 1, wherein the negative electrode active material particles exhibits a diffraction peak having a half width (2θ) of 1.20 or more, the diffraction peak being attributable to an Si(111) crystal face and obtained by X-ray diffraction, and a crystallite size attributable to the crystal face is 7.5 nm or less.

15. The negative electrode active material for a non-aqueous electrolyte secondary battery according to claim 1, wherein the negative electrode active material particles have a median diameter ranging from 0.5 μm to 20 μm.

16. The negative electrode active material for a non-aqueous electrolyte secondary battery according to claim 1, wherein a part of the negative electrode active material particles contains lithium.

17. The negative electrode active material for a non-aqueous electrolyte secondary battery according to claim 1, further comprising carbon-based active material particles.

18. The negative electrode active material for a non-aqueous electrolyte secondary battery according to claim 17, wherein an amount of the negative electrode active material particles is 5 mass % or more with respect to the total mass of the negative electrode active material particles and the carbon-based active material particles.

19. The negative electrode active material for a non-aqueous electrolyte secondary battery according to claim 17, wherein an average diameter G of the carbon-based active material particles to a ratio of an average diameter F of the negative electrode active material particles satisfies $25 \geq G/F \geq 0.5$.

20. The negative electrode active material for a non-aqueous electrolyte secondary battery according to claim 17, wherein the carbon-based active material particles are a graphite material.

21. A non-aqueous electrolyte secondary battery, comprising a negative electrode active material according to claim 1.

22. A method of producing a negative electrode material for a non-aqueous electrolyte secondary battery, the negative electrode material containing negative electrode active material particles, the method comprising:
producing particles of a silicon compound expressed by $SiO_x$ where $0.5 \leq x \leq 1.6$;
at least partially coating a surface of the particles of the silicon compound with a carbon coating;
selecting, from the particles, silicon compound particles coated with a carbon coating
exhibiting a peak at 2θ=25.5° having a half width of 1.5° to 4.5° in an X-ray diffraction spectrum measured after separating the carbon coating from the silicon compound particles, and
exhibiting scattering peaks at 1330 cm$^{-1}$ and 1580 cm$^{-1}$ in Raman spectrum obtained by Raman spectrometry measured after separating the carbon coating from the silicon compound particles, wherein a ratio of an intensity of the scattering peak at 1330 cm$^{-1}$ to that at 1580 cm$^{-1}$ satisfies $0.7<I_{1330}/I_{1580}<2.0$; and
using the selected silicon compound particles coated with the carbon coating for the negative electrode active material particles to produce the negative electrode material.

\* \* \* \* \*